US010900824B2

(12) United States Patent
Godsey

(10) Patent No.: US 10,900,824 B2
(45) Date of Patent: Jan. 26, 2021

(54) SYSTEM AND METHOD FOR WEIGHING ANIMAL FEED INGREDIENTS

(71) Applicant: MWI Veterinary Supply Co., Boise, ID (US)

(72) Inventor: Steve Godsey, Greeley, CO (US)

(73) Assignee: MWI Veterinary Supply Co., Boise, ID (US)

( * ) Notice: Subject to any disclaimer, the term of this patent is extended or adjusted under 35 U.S.C. 154(b) by 266 days.

(21) Appl. No.: 16/061,562

(22) PCT Filed: Jan. 10, 2017

(86) PCT No.: PCT/US2017/012800
§ 371 (c)(1),
(2) Date: Jun. 12, 2018

(87) PCT Pub. No.: WO2017/123520
PCT Pub. Date: Jul. 20, 2017

(65) Prior Publication Data
US 2018/0364091 A1    Dec. 20, 2018

Related U.S. Application Data

(63) Continuation-in-part of application No. 62/277,846, filed on Jan. 12, 2016.

(51) Int. Cl.
*G01G 19/08* (2006.01)
*E02F 9/26* (2006.01)
(Continued)

(52) U.S. Cl.
CPC ......... *G01G 19/083* (2013.01); *A01K 5/0258* (2013.01); *E02F 9/26* (2013.01);
(Continued)

(58) Field of Classification Search
None
See application file for complete search history.

(56) References Cited

U.S. PATENT DOCUMENTS 4,815,042 A    3/1989  Pratt
4,995,468 A  *  2/1991  Fukuda ................ G01G 19/10
                                                      177/139
(Continued)

FOREIGN PATENT DOCUMENTS

EP    2511678 A1    10/2012
JP    59084119 A  *  5/1984  ............. G01G 19/08

OTHER PUBLICATIONS

RDS Technology, "Weighlog Alpha 10 User Guide" RDS Technology Ltd 2012 (Year: 2012).*

(Continued)

*Primary Examiner* — John C Kuan
(74) *Attorney, Agent, or Firm* — Klarquist Sparkman, LLP

(57) ABSTRACT

Embodiments of a system and method for weighing animal feed ingredients using a bucket loader to dispense a measured quantity of ingredient into a feed scale are disclosed. A weight of the feed ingredient in the bucket is determined and compared to a weight of the feed ingredient subsequently transferred from the bucket to the feed scale. Based on the comparison, data received from components of the system is calibrated to increase accuracy of future weighings of the feed ingredient.

15 Claims, 9 Drawing Sheets

(51) Int. Cl.
*G06F 9/54* (2006.01)
*G01G 19/10* (2006.01)
*G06Q 50/02* (2012.01)
*A01K 5/02* (2006.01)
*G06F 3/0482* (2013.01)
*G06K 9/62* (2006.01)
*A01K 1/10* (2006.01)

(52) U.S. Cl.
CPC ............ *G06F 3/0482* (2013.01); *G06F 9/542* (2013.01); *G06K 9/6215* (2013.01); *G06K 9/6288* (2013.01); *A01K 1/10* (2013.01); *E02F 9/264* (2013.01); *G01G 19/10* (2013.01); *G06Q 50/02* (2013.01)

(56) References Cited

U.S. PATENT DOCUMENTS

| | | | |
|---|---|---|---|
| 5,008,821 A | | 4/1991 | Pratt |
| 5,340,211 A | | 8/1994 | Pratt |
| 5,714,719 A | * | 2/1998 | Otsuka .................. G01G 19/083 177/141 |
| 8,655,751 B2 | | 2/2014 | Renz |
| 2008/0319710 A1 | | 12/2008 | Hsu et al. |
| 2009/0063222 A1 | * | 3/2009 | Doan ...................... G07C 5/008 705/7.13 |
| 2010/0161185 A1 | * | 6/2010 | Marathe ................. E02F 9/264 701/50 |
| 2014/0019015 A1 | * | 1/2014 | Claxton ................... E02F 9/00 701/50 |
| 2014/0019312 A1 | * | 1/2014 | Renz ...................... G06Q 10/10 705/28 |
| 2014/0291038 A1 | * | 10/2014 | Hague ...................... G01G 5/04 177/1 |
| 2015/0002303 A1 | * | 1/2015 | Stanley .................. B65G 67/04 340/666 |

OTHER PUBLICATIONS

Actronic, "Accurate and Profitable Dairy Farming," Jul. 2013, 2 pp.
Actronic, "Onboard Weighing for Farming," Oct. 2013, 4 pp.
Actronic, "Wheel loader scales—L-Series," Nov. 2013, 8 pp.
"dg precisionFEEDING", dinamica generale, Jun. 2013, 9 pp.
"Feeding Buckets—One operation from the clamp to the Feeding Area", MX, Nov. 9, 2009, 8 pp.
Grooms, "Weighing System Made for Accurate Feed Measurement," published by Agriview, Aug. 19, 2015, 2 pp.
International Search Report and Written Opinion dated Apr. 10, 2017, for PCT/US2017/012800, 14 pp.
"RDS Weighlog Alpha," retrieved from www.rdssystems.com.nz/weighlog-alpha-10.html on Oct. 12, 2015, 3 pp.
"Scale-Tec Hydraulic Scales" retrieved from www.scale-tec.com/solutions/2-11/Hydraulic-Scales on Oct. 12, 2015, 2 pp.
Yohn et al., "Using Hydraulics as a Scale on the Farm," publication of the Extension Service of West Virginia University, Jun. 2007, 9 pp.

* cited by examiner

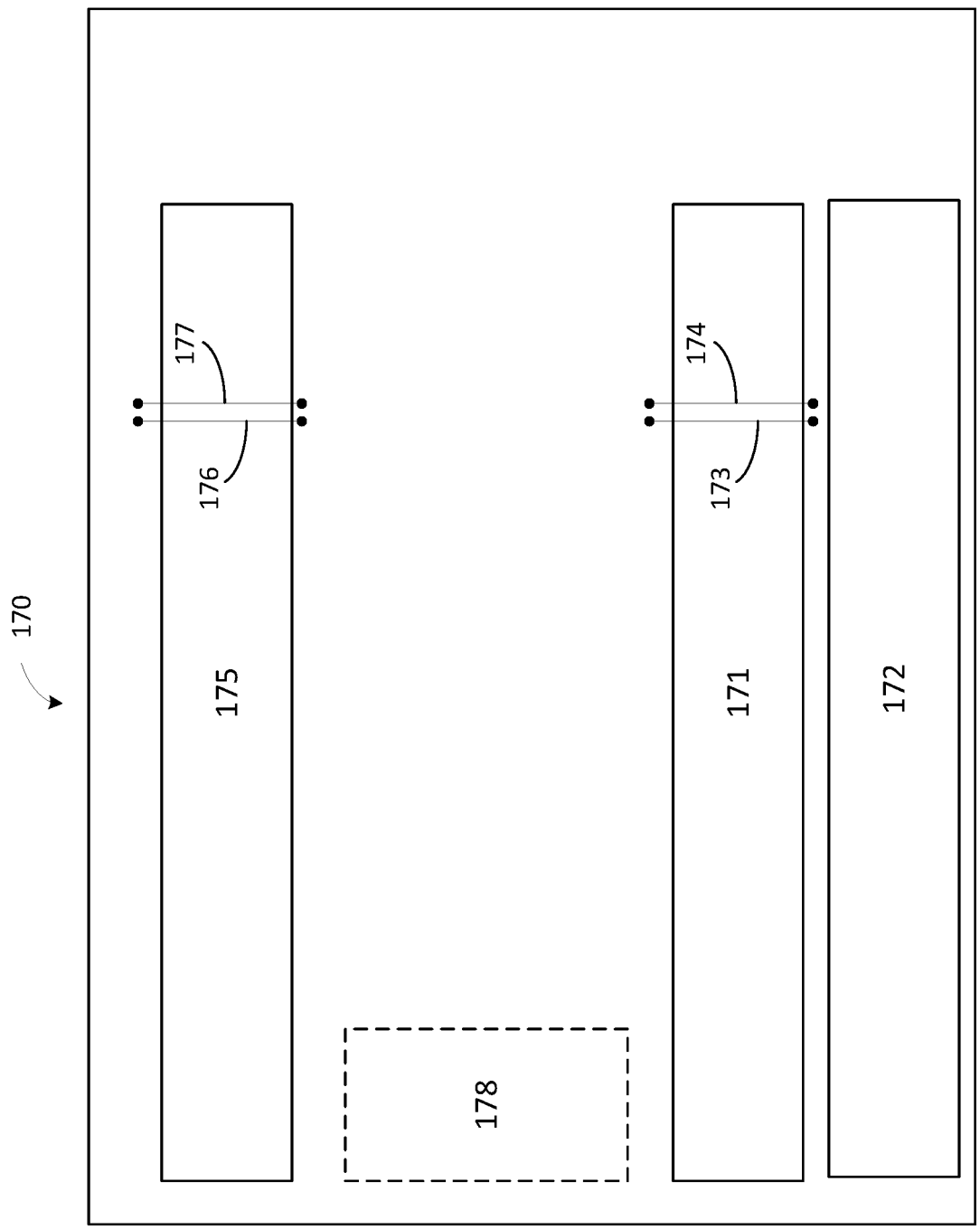

SYSTEM AND METHOD FOR WEIGHING ANIMAL FEED INGREDIENTS

CROSS-REFERENCE TO RELATED APPLICATION

This is the U.S. National Stage of International Application No. PCT/US2017/012800, filed Jan. 10, 2017, which was published in English under PCT Article 21(2), which in turn claims the benefit of U.S. Provisional Application No. 62/277,846, filed Jan. 12, 2016, each of which is herein incorporated by reference in its entirety.

FIELD

This disclosure concerns embodiments of a system and method for weighing animal feed ingredients using a bucket loader to dispense a measured quantity of ingredient into a feed scale.

BACKGROUND

A feed ration batch is prepared by combining feed ingredients in the desired proportions and amounts. When preparing large feed batches, a bucket loader is useful for transferring feed ingredients to a feed batching system. Conventionally, a user fills the bucket with the ingredient, drives the loader to the feed scale, and gradually tips the bucket to transfer the feed ingredient to the feed scale while watching the feed scale to determine when to stop transferring the feed ingredient. The user may transfer some of the feed ingredient from the bucket to the feed scale, wait for the feed scale weight to stabilize, and then repeat the process until the bucket is empty or the feed scale weight has reached the desired target weight. If the target weight is reached and the bucket still contains some of the feed ingredient, the user must drive the loader back to the ingredient pile and dump the extra feed ingredient back onto the ingredient pile. This process is time-consuming and inefficient. Additionally, if the feed ingredient is added into a mixer, overmixing may occur due to the excessive time required to transfer the target weight of feed additive.

Several commercially available systems compute the estimated weight of material in a loader bucket by measuring the bucket height and the pressure in the hydraulic system that lifts the bucket. These have several key deficiencies: (i) they do not measure the angle that the bucket is tipped, which very much affects the hydraulic pressure as the center of gravity of the bucket changes; (ii) they are designed to measure the weight of an entire bucket of material while it is being lifted through a range of height rather than to continuously display the weight as material is being dribbled out of the bucket; (iii) they cannot be integrated in real-time with a complete batching system that tells the operator exactly how to use this information; (iv) because of this lack of integration, the existing systems cannot be automatically and/or continuously calibrated by comparing the computed bucket weight with the amount of ingredient that appears in the feed scale when the bucket is dumped into it. Because of these deficiencies, these systems are not being used in feed manufacturing processes to obtain a desired quantity of material in a loader bucket. Thus, a need exists for an accurate method of obtaining a desired quantity of material in a loader bucket while preparing feed rations.

SUMMARY

Embodiments of a system and method for weighing animal feed ingredients using a bucket loader to dispense a measured quantity of feed ingredient into a feed scale are disclosed. The system includes a computer system configured to (a) receive data from a loader digital scale indicator, the data providing an indication of a combined weight of a bucket of a loader and a feed ingredient therein; (b) receive data from a height position indicator, the data indicating a height of the bucket; (c) receive data from a bucket position indicator, the data indicating a tip angle of the bucket; (d) determine, based at least in part on (i) the data received from the loader digital scale indicator, the height position indicator, and the bucket position indicator, and (ii) stored calibration data comprising combinations of digital scale data and position indicator data, a determined weight of the quantity of the feed ingredient in the bucket; (e) receive data from a feed batching system comprising a feed scale and a feed scale digital scale indicator, wherein the data received includes at least a transferred weight of the quantity of the feed ingredient transferred from the bucket to the feed scale; (f) compare the transferred weight to the determined weight to provide a comparison; and (g) optionally, use the comparison as a data calibration factor for data received from the loader digital scale indicator, the height position indicator, the bucket position indicator, or any combination thereof, to provide increased accuracy of a subsequent determined weight of a subsequent quantity of the feed ingredient in the bucket. The computer system may include a loader computer, a feed batching system computer, or a loader computer and a feed batching system computer.

In some embodiments, the system further includes a first hydraulic pressure transducer configured to sense hydraulic pressure in a hydraulic lift cylinder of a lifting arm of the bucket, a loader digital scale indicator configured to receive pressure data from the first hydraulic pressure transducer and provide the indication of the combined weight of the bucket and the quantity of the feed ingredient therein based on the pressure data, a height position indicator configured to measure height of the bucket, and a bucket position indicator configured to measure a tip angle of the bucket. In certain embodiments, the system also includes a surface position indicator configured to measure a slope of the surface on which the loader is positioned, and the computer system further is configured to receive slope data from the surface position indicator.

In any or all of the above embodiments, the system may further include a wireless data transceiver configured to transmit data (i) between the feed batching system computer and the loader computer, (ii) from the feed scale digital indicator to the loader computer, or (iii) from the loader digital scale indicator, the height position indicator, the bucket position indicator, the surface position indicator, or any combination thereof, to the feed batching system computer. In any or all of the above embodiments, the system may further include a display within a cab of the loader, wherein the display is configured to display data output from the computer system; the display may be a touchscreen display.

In some embodiments, a method for weighing animal feed ingredients using a bucket loader to dispense a measured quantity of feed ingredient into a feed scale includes determining a weight of a feed ingredient in a bucket of a loader by (i) calculating, using an embodiment of the disclosed system, and based at least in part on measurement data and calibration data for the loader digital scale indicator, the height position indicator, and the bucket position indicator, a determined weight of the quantity of the feed ingredient in the bucket; (ii) transferring the quantity of the feed ingredient from the bucket of the loader to a feed scale; (iii)

receiving, using the computer system, data from the feed batching system, wherein the data received from the feed batching system includes at least a transferred weight of the feed ingredient transferred from the bucket to the feed scale; (iv) comparing, using the computer system, the transferred weight to the determined weight to provide a comparison; and (v) optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

In some embodiments, a method for weighing animal feed ingredients using a bucket loader to dispense a measured quantity of feed ingredient into a feed scale includes (a) loading a quantity of a feed ingredient into a bucket of a loader, the loader comprising a display in a cab of the loader for receiving and displaying information to a user of the loader; (b) lifting, with a lift arm comprising a hydraulic lift cylinder, the bucket of the loader to a lifted height; (c) determining a weight of the feed ingredient in the bucket of the loader by (i) receiving, using a loader digital scale indicator, pressure data from a first hydraulic pressure transducer configured to sense hydraulic pressure in a lift cylinder of the bucket when the bucket is at the lifted height, (ii) determining, using the loader digital scale indicator, a weight indication of a combined weight of the quantity of the feed ingredient and the bucket, (iii) measuring with a height position indicator a height of the bucket, and (iv) measuring with a bucket position indicator a tip angle of the bucket, (v) receiving, using a computer system, measurement data comprising the weight indication from the loader digital scale indicator, height data from the height position indicator, and tip angle data from the bucket position indicator, and (vi) calculating, using the computer system and based at least in part on the measurement data and calibration data for the loader digital scale indicator, the height position indicator, and the bucket position indicator, a determined weight of the quantity of the feed ingredient in the bucket; (d) transferring the quantity of the feed ingredient from the bucket of the loader to a feed scale; (e) receiving, using the computer system, data from a feed batching system comprising the feed scale and a feed scale digital scale indicator, wherein the data received includes at least a transferred weight of the feed ingredient transferred from the bucket to the feed scale; (f) comparing, using the computer system, the transferred weight to the determined weight to provide a comparison; and (g) optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket. The method may further include (h) measuring with a surface position indicator or the height position indicator a slope of the surface on which the loader is positioned; (i) receiving, using the computer system, measurement data comprising slope data from the surface position indicator or the height position indicator; and (j) calculating, using the computer system and based at least in part on the measurement data and calibration data for the loader digital scale indicator, the height position indicator, the bucket position indicator, and the surface position indicator, the determined weight of the quantity of the feed ingredient.

In any or all of the above embodiments, calibration may be performed after each comparison. Alternatively, calibration is performed if the comparison (i.e., the difference between the transferred weight and the determined weight) is outside a predetermined tolerance range.

In some embodiments, a computer system (a) receives measurement data comprising (i) a weight indication from a loader digital scale indicator, wherein the weight indication is determined based at least in part on pressure data from a first hydraulic pressure transducer configured to sense hydraulic pressure in a lift cylinder of a bucket on a bucket loader when the bucket is at a lifted height, (ii) height data for the bucket from a height position indicator, and (iii) tip angle data for the bucket from a bucket position indicator; (b) calculates, based at least in part on the measurement data and calibration data for the loader digital scale indicator, the height position indicator, and the bucket position indicator, a determined weight of a quantity of a feed ingredient in the bucket; (c) receives, after the feed ingredient has been transferred from the bucket to a feed scale, data from a feed batching system comprising the feed scale and a feed scale digital scale indicator, wherein the data received includes at least a transferred weight of the feed ingredient transferred from the bucket to the feed scale; (d) compares the transferred weight to the determined weight to provide a comparison; and (e) optionally calibrates data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

The foregoing and other objects, features, and advantages of the invention will become more apparent from the following detailed description, which proceeds with reference to the accompanying figures.

BRIEF DESCRIPTION OF THE DRAWINGS

FIG. 4 is a schematic diagram of an exemplary display for use with the disclosed system.

DETAILED DESCRIPTION

Figure 1:
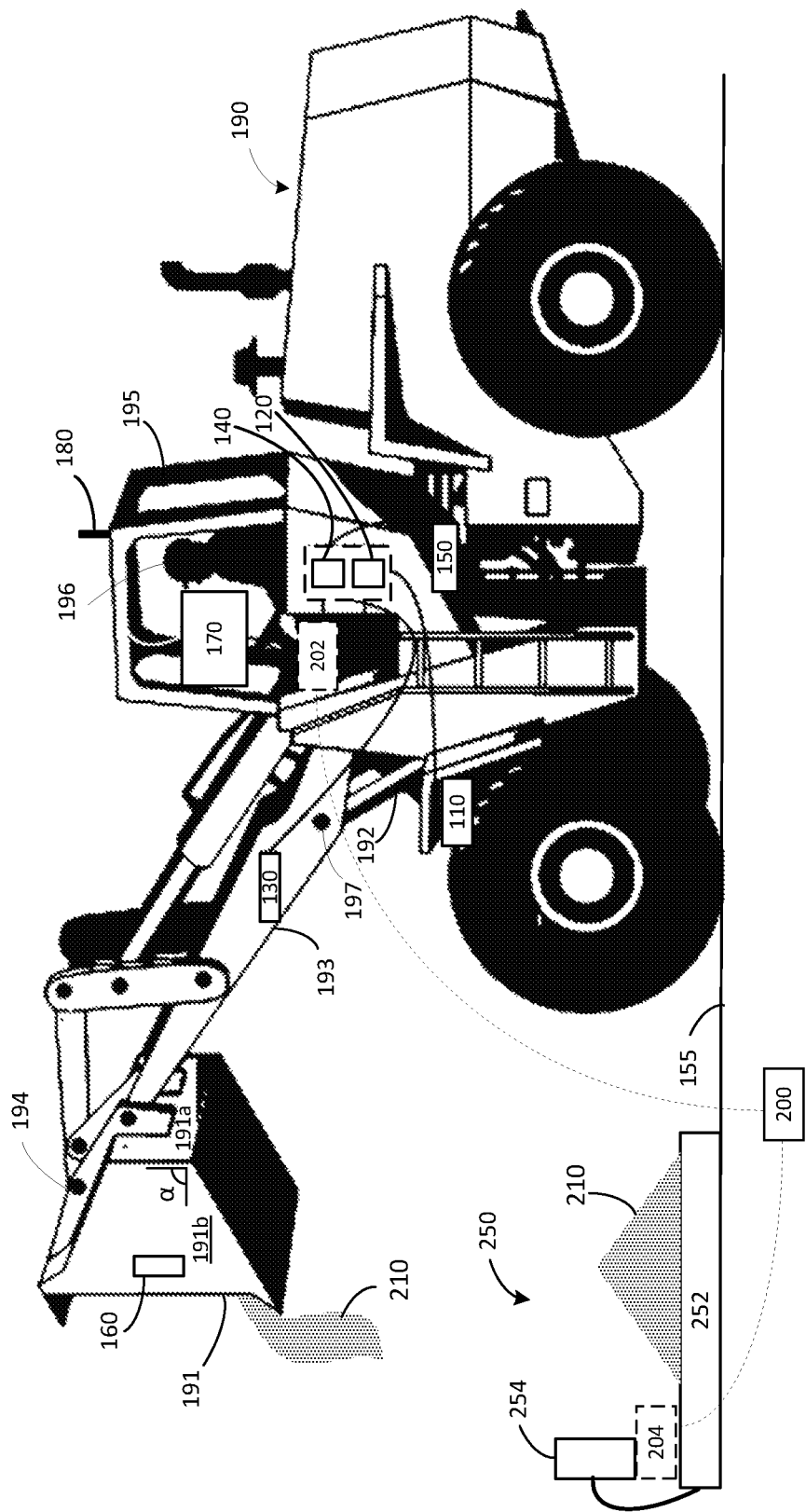
FIG. 1 is a schematic diagram of a bucket loader including an exemplary embodiment of a system for weighing animal feed ingredients.

Embodiments of a system and method for weighing animal feed ingredients using a bucket loader to dispense a measured quantity of feed ingredient into a feed scale are disclosed. The disclosed system and method provide increased accuracy in feed ingredient measurement and/or decreased time requirements for preparing batches of animal feed.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities as used in the specification or claims are to be understood as being modified by the term "about." Accordingly, unless otherwise implicitly or explicitly indicated, or unless the context if properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

AR: Amount remaining; equal to target weight minus scale weight (TW−SW).

Bluetooth® device: An ultra-high frequency radio wave transceiver that transmits and receives radio waves within a frequency band of from 2.4 to 2.485 GHz.

BW: Beginning weight; equal to ending weight of previous ingredient in scale; when referring to first ingredient, equal to empty scale weight.

CW: Cutoff weight; equal to target weight minus free fall (TW−FF).

EW: Ending weight; final averaged scale weight.

FB: Full bucket; the weight of a full loader bucket of an ingredient (can be set for each ingredient).

FF: Free fall; the anticipated quantity that will appear on the scale after the operator stops dispensing from the loader bucket.

FSOC: Free-space optical communication, a technology using light to wireless transmit data.

LAT: Loader average time; after loader settle time (LST) elapses, the number of seconds to average together multiple loader weight (LW) readings to obtain accurate LW.

LST: Loader settle time; number of seconds to wait for the remainder of ingredient to fall from bucket back into the ingredient pile.

LW: Loader weight; net weight of material in the loader bucket, calculated in real-time using hydraulic pressure, bucket elevation, surface slope, and interpolation between multi-point calibration values previously stored for the ingredient.

QW: Quiet weight; a "sliding window" of scale weight (SW) values averaged together, acquired between additions of ingredient into the scale.

RF: Radio frequency

SAT: Scale average time; after the scale settle time (SST) elapses, the number of seconds to average together multiple scale weight (SW) readings to obtain accurate ending weight (EW).

SST: Scale settle time; number of seconds to wait for remainder of ingredient to fall from bucket into the scale after cutoff weight (CW) is exceeded.

SW: Scale weight; the current gross reading.

Transceiver: A dual-purpose receiver and transmitter device.

TW: Target weight; the scale weight at which the desired quantity will have been dispensed.

UI: User interface; the UI is displayed (e.g., on a touchscreen computer) in the loader.

Wi-Fi® device: A wireless transceiver that transmits and receives radio waves within a frequency band of 2.4 GHz or 5 GHz.

II. System for Weighing Feed Ingredients

Embodiments of the disclosed system are useful for weighing feed ingredients using a bucket loader to load a feed ingredient and transfer the feed ingredient to a feed batching system. FIG. 1 is a schematic diagram of an exemplary loader system. The system includes one or more hydraulic pressure transducers 110, a digital scale indicator 120, a height position indicator 130, an input/output module 140, a bucket position indicator 160, a display/user interface 170, and a wireless data transceiver 180. In some embodiments, the system further includes a surface position indicator 150.

The system is installed on a loader 190 comprising a bucket 191. The loader 190 further comprises one or more hydraulic lift cylinders 192 for lifting one or more lift arms 193. The lift arm(s) 193 raise and lower the bucket 191, and are attached to the bucket at one or more attachment points 194. The loader 190 includes a cab 195 wherein a user 196 operates the loader.

The system further includes a computer system 200. The computer system 200 may comprise a computer 202 in the cab 195, a computer 204 associated with a feed batching system 250, or both computer 202 and computer 204. The computer system is discussed in further detail below.

The one or more hydraulic pressure transducers 110 are mounted where they can sense pressure in one or more hydraulic lift cylinders 192 of the lift arms 193 that lift the bucket 191. The hydraulic pressure transducer 110 may be mounted in any suitable manner and in any suitable position to sense the pressure in the hydraulic lift cylinder 192. In the exemplary arrangement of FIG. 1, the hydraulic pressure transducer 110 is mounted in a manifold at a base of the hydraulic lift cylinder 192. As the weight of the bucket 191 and any ingredient(s) contained therein increases, pressure in the hydraulic lift cylinder(s) 192 increases. Additionally, the hydraulic lift cylinder pressure may vary as a height of the bucket 191 varies relative to a surface 155 on which the loader 190 sits. In one embodiment, one hydraulic pressure transducer 110 senses pressure in the hydraulic lift cylinder 192 of one lift arm 193. In a second embodiment, two hydraulic pressure transducers 110 sense pressure in the hydraulic lift cylinders 192 of each of two lift arms 193. The hydraulic pressure transducer 110 has a rated maximum suitable for the pressures experienced by the lift cylinders, such as a pressure of between 10,000 psi and 20,000 psi (between 69 and 138 MPa). In some embodiments, the hydraulic pressure transducer 110 accepts any suitable excitation voltage, such as an excitation voltage of from 5 VDC to 10 VDC, and has an output of at least 2 mv/V.

Pressure data from the hydraulic pressure transducer(s) 110 is transmitted to a digital scale indicator 120. In some embodiments, the pressure data is sampled several times per second, such as 10 times per second. The digital scale indicator 120 may be mounted on the loader 190 in any suitable manner and any location suitable for receiving pressure data from the hydraulic pressure transducer 110. In the exemplary embodiment of FIG. 1, the digital scale indicator 120 is mounted in or on the loader cab 195. The digital scale indicator may or may not be mounted such that it is visible to a user 196 within the cab 195. Data may be transmitted from the hydraulic pressure transducer 110 to the digital scale indicator 120 by any suitable method. In one embodiment, data is transmitted by a communication connection, e.g., via an electrical or optical carrier. For example, the hydraulic pressure transducer may be connected to the digital scale indicator 120 via a 5-wire shielded cable. In another embodiment, the pressure data is wirelessly transmitted from the hydraulic pressure transducer 110 to the digital scale indicator 120 via radiofrequency (RF) technology (e.g., Bluetooth® or Wi-Fi® technology) or free-space optical communication (FSOC) technology. The digital scale indicator 120 is capable of producing a continuous serial output. Advantageously, the digital scale indicator 120 has digital filtering (averaging) capability. In some embodiments, the digital scale indicator 120 accepts an excitation voltage of from 5 VDC to 10 VDC. The digital scale indicator 120 may have any suitable resolution, such as at least 100,000 internal units of resolution. Desirably, the digital scale indicator 120 is rated to survive dust and ambient temperatures between −20° F. and 140° F. (between −29° C. and 60° C.). In some embodiments, the digital scale indicator 120 determines, based at least in part on the pressure data and calibration data, a weight indication of a combined weight of the bucket 191 and a feed ingredient 210 within the bucket 191. The digital scale indicator 120 transmits the weight indication to the computer system 200. Transmission may be via a communication connection or via wireless technology. In some embodiments, the digital scale indicator 120 is connected to a loader computer 202 via a serial cable.

The system further comprises a height position indicator 130. The height position indicator 130 is configured to measure height of the bucket 191 relative to a surface 155 on which the loader 190 is positioned. The height position indicator 130 may be mounted in any position suitable for measuring the bucket height. In some embodiments, the height position indicator 130 is mounted on a lift arm 193 to which the bucket 191 is attached via one or more attachment points 194. Advantageously, the height position indicator 130 may be mounted proximate a lower hinge pin 197 of the lift arm 193. The height position indicator 130 is secured to the lift arm 193 by any suitable fastener including, but not limited to, screws, such as self-tapping metal screws, or a suitable adhesive. In certain embodiments, the loader 190 includes two lift arms 193, and a height position indicator 130 attached to each lift arm 193. The height position indicator 130 may be any device capable of determining the distance between the bucket 191 and the surface 155 on which the loader is positioned, such as the distance between a the bucket lower wall 191a and the surface 155. Suitable height position indicators include, but are not limited to, an inclinometer, a spring-loaded position sensor, or a lift cylinder linear displacement transducer. In some embodiments, the height position indicator 130 is an inclinometer, such as a digital inclinometer. The inclinometer is suitable for mounting on a vertical surface. In some embodiments, the inclinometer has a resolution of at least 0.1 degree, and a maximum range of at least 60 degrees, such as a range from 0-60 or from 0-90 degrees. Advantageously the inclinometer is rated for extreme environmental conditions, e.g., high and low temperatures, direct moisture, and/or shock. In certain embodiments, the inclinometer has a two-wire output, such as a two-wire, 4-20 mA output. In such embodiments, a first output of the height position indicator 130 indicates how high the bucket 191 is lifted, and a second output of the height position indicator indicates a slope of the surface 155 on which the loader 190 is positioned.

In some embodiments, data from the height position indicator 130 is transmitted to an input/output module 140. In some embodiments, data from the height position indicator 130 is repeatedly sampled at any suitable sample rate, such as several times per second, and in some embodiments 10 times per second. Data may be transmitted by a communication connection, e.g., via an electrical or optical carrier. For example, the height position indicator 130 may be connected to the input/output module 140 via a twisted-pair cable. When using a wired connection, the height position indicator 130 is mounted proximate the lower hinge pin 197 of the lift arm to minimize movement of the cable connecting the height position indicator to the input/output module 140. In another embodiment, the data is wirelessly transmitted from the height position indicator 130 to the input/output module 140, e.g., via electromagnetic communications (including RF, microwave, and infrared communications) or FSOC technology. In some embodiments, wireless transmission is performed via RF technology. In some embodiments, the input/output module 140 is a programmable logic controller (PLC) with at least two channels, such as two 4-20 mA channels. The input/output module 140 may provide power for the height position indicator 130. Desirably, the input/output module 140 has an environmental condition rating similar to the height position indicator 130. One suitable input/output module is an ADAM-6024 input/output module (available, e.g., from Advantech America, Milpitas, Calif.). The input/output module 140 may be mounted on the loader 190 in any suitable manner and any location suitable for receiving data from the height position indicator 130. In the exemplary embodiment of FIG. 1, the input/output module 140 is mounted in or on the loader cab 195. The input/output module 140 may be mounted near the digital scale indicator 120, as shown in FIG. 1. The input/output module 140 is configured to transmit data from the height position indicator to the computer system 200. Transmission may be via a communication connection or via wireless technology. In some embodiments, the input/output module 140 is connected to a loader computer 202 via a network cable.

Hydraulic pressure readings can change for a given bucket height and tilt when the slope on which the loader is positioned is changed. Thus, in some embodiments, the system further comprises a surface position indicator 150. The surface position indicator 150 is configured to measure a slope of the surface 155 on which the loader 190 is positioned. The surface position indicator 150 may be mounted in any position suitable for measuring surface slope. The surface slope measurement may be used to adjust the determined weight of the feed ingredient in the bucket or even to completely disable the weighing process if the slope is too large. In the exemplary arrangement of FIG. 1, the surface position indicator 150 is mounted underneath the cab 195, e.g., on a vertical frame member. The surface position indicator 150 is secured in place by any suitable fastener including, but not limited to, screws, such as self-tapping metal screws, or a suitable adhesive. The surface position indicator 150 may be any device suitable for measuring slope of the surface 155 on which the loader is positioned, i.e., slope relative to level ground or a horizontal surface. Suitable devices include, but are not limited to, an inclinometer, a tilt sensor (a device that measures tilting in two axes of a reference plane), or an accelerometer (a device that measures tilt angle with reference to the earth's ground plane). In some embodiments, the surface position indicator 150 is an inclinometer as described above with respect to the height position indicator 130. Data from the surface position indicator 150 may be transmitted to the input/output module 140. Data may be transmitted by a communication connection, e.g., via an electrical or optical carrier. Alternatively, the data may be wirelessly transmitted from the surface position indicator 150 to the input/output module 140, e.g., via RF or FSOC technology.

The system includes a bucket position indicator 160. The bucket position indicator 160 is configured to measure a tip angle α of the bucket 191 relative to a horizontal bucket position. A horizontal bucket position is defined as the position in which a lower wall 191a of the bucket 191 is perpendicular to a direction of gravitational acceleration, the position in which the lower wall 191a is parallel to the plane of the horizon, or the position in which the lower wall 191a is at right angles to the vertical. A tip angle α of 0 indicates that the bucket 191 is in a horizontal position. A tip angle α of 90 indicates that the bucket 191 is tipped 90 degrees from horizontal such that the lower wall 191a is vertical or parallel to the direction of gravitational acceleration. The bucket position indicator 160 may be mounted in any suitable manner and in any suitable position to measure the tip angle α of the bucket 191. In some embodiments, as shown in FIG. 1, the bucket position indicator 160 is mounted on an outer surface 191b of the bucket 191. The bucket position indicator 160 may be any device suitable for measuring the tip angle α of the bucket 191. Suitable devices include, but are not limited to, an inclinometer, a spring-loaded position sensor, or a tilt cylinder linear displacement transducer. In one embodiment, the bucket position indicator 160 is an inclinometer. Data from the bucket position indicator 160 may be transmitted to the computer 200 via the input/output module 140. In one embodiment, data is transmitted by a communication connection, e.g., via an electrical or optical carrier. In another embodiment, the data is wirelessly transmitted from the bucket position indicator 160 to the input/output module 140, e.g., via electromagnetic communications (including RF, microwave, and infrared communications) or FSOC technology. In some embodiments, wireless transmission is performed via RF technology.

As shown in FIG. 1, a feed ingredient 210 is transferred from the bucket 191 to a feed batching system 250. The feed batching system comprises a feed scale 252 and a feed scale digital indicator 254. The feed batching system may further comprise a feed batching system computer 204. The feed scale digital indicator 254 receives weight data from the feed scale 252. Weight data received by the feed scale digital indicator 254 is transmitted to the computer system 200, e.g., the feed batching system computer 204 or the loader computer 202. In one embodiment, data is transmitted by a communication connection, e.g., via an electrical or optical carrier, to the feed batching system 204. In another embodiment, the data is wirelessly transmitted from the feed scale digital indicator 254 to the computer system 200 (e.g., computer 202 or computer 204), e.g., via electromagnetic communications (including RF, microwave, and infrared communications) or FSOC technology. In some embodiments, wireless transmission is performed via RF technology.

The system further includes a display/user interface 170. Display 170 typically is mounted in the loader cab 195, as shown in FIG. 1, such that a user 196 may view the display 170 while operating the loader 190. In some embodiments, the display 170 is a touchscreen display. The touchscreen display may be part of computer 202, such as when computer 202 is a tablet device. Advantageously, the tablet is rugged and suitable for use in environmental conditions including broad temperature ranges, moisture exposure, and/or shock. Suitable tablets include, but are not limited to, the Panasonic Toughpad® device. The display 170 is configured to display data output from the computer system (e.g., loader computer 202 and/or feed batching system computer 204), instructions, and/or alarms to the user 196. When the display 170 is a touchscreen display, the display 170 further is configured to receive user input and transmit the user input to the computer system 200 (e.g., loader computer 202 and/or feed batching system computer 204).

Computer system 200 may comprise the loader computer 202 and/or the feed batching system computer 204. In one embodiment, the computer system 200 comprises the loader computer 202 and the feed batching system computer 204. Computers 202, 204 are configured to communicate wirelessly with one another, e.g., via electromagnetic communications (including RF, microwave, and infrared communications) or FSOC technology. In some embodiments, wireless transmission is performed via RF technology. In an independent embodiment, the computer system 200 does not include a loader computer 202, and data from loader components (the digital scale indicator 120, height position indicator, input/output module 140, surface position indicator 150, bucket position indicator 160, display 170, and combinations thereof) is wirelessly transmitted to the feed batching system computer 204. In another independent embodiment, the computer system 200 does not include a feed batching system computer 204, and data from the feed scale digital indicator 200 is wirelessly transmitted to the loader computer 202. The computer system 200 is configured to (a) receive data from the loader components (e.g., the loader scale digital indicator, height position indicator, surface position indicator, bucket position indicator, and combinations thereof); (b) determine, based at least in part on (i) the data received and (ii) stored calibration data comprising combinations of data from the components, a determined weight of the quantity of the feed ingredient in the bucket; (c) receive data from a feed batching system comprising a feed scale and a feed scale digital scale indicator, wherein the data received includes at least a transferred weight of the quantity of the feed ingredient transferred from the bucket to the feed scale; (d) compare the transferred weight to the determined weight to provide a comparison; and (e) optionally, use the comparison as an additional calibration factor. For example, using the comparison as a calibration factor may comprise adjusting the data received from each component by a factor of [x]% where [x] can be set for each of the loader components.

The system comprises a wireless data transceiver 180. As shown in FIG. 1, the wireless data transceiver 180 may be mounted on the loader cab 195. Suitable wireless data transceiver include, but are not limited to, a wireless transceiver that transmits and receives radio waves within a frequency band of 2.4 GHz or 5 GHz, an ultra-high frequency radio wave transceiver that transmits and receives radio waves within a frequency band of from 2.4 to 2.485 GHz, or a free-space optical communication transceiver. In some embodiments, the wireless data transceiver 180 is configured to transmit data between the loader computer 202 and the feed batching system computer 204. In an independent embodiment, the computer system 200 does not include a loader computer 202, and the wireless data transceiver is configured to transmit data between loader components (the digital scale indicator 120, height position indicator, input/output module 140, surface position indicator 150, bucket position indicator 160, display 170, and combinations thereof) and the feed batching system computer 204. In yet another independent embodiment, the computer system 200 does not include a feed batching system computer 204, and the wireless data transceiver 180 is configured to transmit data between the loader computer 202 and the feed scale digital indicator 254.

Figure 2:
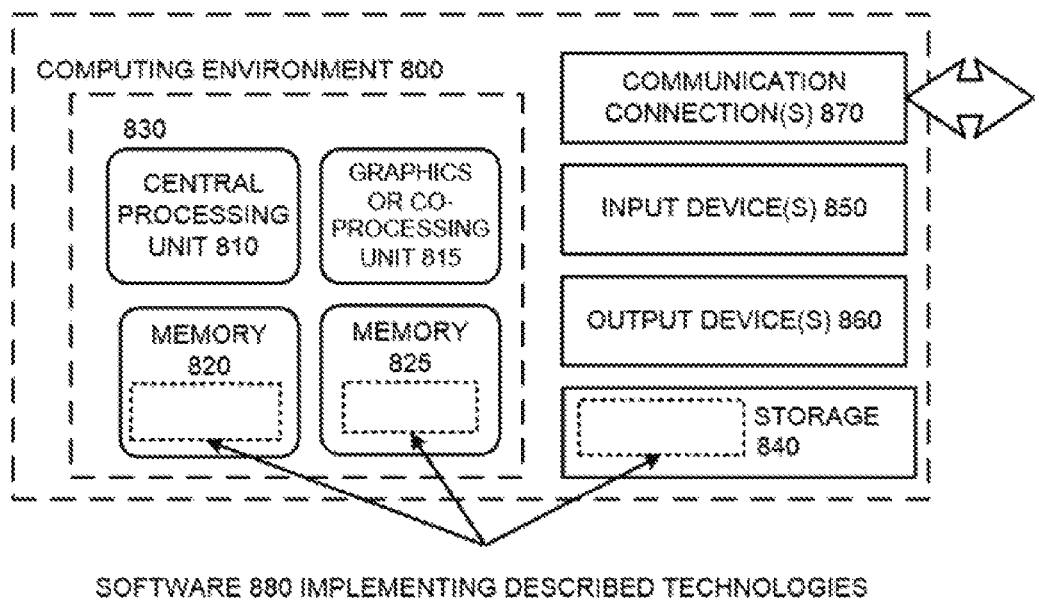
FIG. 2 is a representative diagram of an exemplary computing environment.

The following is a general description of a computing environment suitable for use with the disclosed computer system 200. FIG. 2 depicts a generalized example of a suitable computing environment 800 in which software and control algorithms for the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, gaming system, mobile device, programmable automation controller, etc.).

With reference to FIG. 2, the computing environment 800 includes one or more processing units 810, 815 and memory 820, 825 (e.g., for storing data indicative of stage vibration). In FIG. 2, this basic configuration 830 is included within a dashed line. The processing units 810, 815 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 2 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, in some embodiments, the computing environment 800 includes storage 840, one or more input devices 850, one or more output devices 860, and one or more communication connections 870. An interconnection mechanism (not shown) such as a bus, controller, or network, interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium that can be used to store information in a non-transitory way and can be accessed within the computing environment 800. The storage 840 stores instructions for the software 880 implementing one or more innovations described herein (e.g., for storing data of weights, feed ingredient identifications, tolerances, calibrations, etc.).

The input device(s) 850 may be, for example: a touch input device, such as a touchscreen display, keyboard, mouse, pen, or trackball; a voice input device; a scanning device; any of various sensors; another device that provides input to the computing environment 800; or combinations thereof. In some embodiments, the input device is a touchscreen display. The output device(s) 860 may be a display, printer, speaker, CD-writer, or another device that provides output from the computing environment 800. In some embodiments, the output device is a touchscreen display.

The communication connection(s) 870 enable communication over a communication medium to another computing entity. For example, the communication connection(s) may enable communication between a computer in the loader cab and a computer of a feed batching system. The communication medium conveys information, such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

III. Method of Weighing Feed Ingredients

With reference to FIG. 1, a method for weighing feed ingredients using an embodiment of the disclosed system installed on a bucket loader 190 includes (i) loading a quantity of a feed ingredient 210 into the loader bucket 191; (ii) lifting, with a lift arm 193 comprising a hydraulic lift cylinder 192, the bucket 191 to a lifted height; (iii) determining a weight of the feed ingredient 210 in the bucket 191; (iv) transferring the quantity of the feed ingredient 210 from the bucket 191 to a feed scale 252; (v) receiving from the feed batching system 250 data including at least a transferred weight of the feed ingredient 210 transferred from the bucket 191 to the feed scale 252; and (vi) comparing, using the computer system 200, the transferred weight to the determined weight of the feed ingredient 210 in the bucket 191 to provide a comparison, wherein the comparison is the difference between the transferred weight and the determined weight.

The method may further include calibrating, using the computer system 200, the loader digital scale indicator 120, the height position indicator 130, the bucket position indicator 160, or any combination thereof, based at least in part on the comparison, to provide revised calibration data and increased accuracy of a subsequent determined weight of a subsequent quantity of the feed ingredient in the bucket. It is understood that the transferred weight of the feed ingredient as determined by the feed scale digital indicator 254 is accurate, despite the inherent noise in the feed scale readings, because the transferred weight is obtained by averaging together a plurality of scale readings (typically over at least a 5-second period of time) to cancel out the noise. The calibration factors for the loader components (e.g., hydraulic pressure transducer, height position indicator, surface position indicator, bucket position indicator) may be adjusted by a percentage of the difference between the determined weight and the transferred weight. The percentage may be set by the user, or the percentage may be pre-set. In either case, the percentage is less than 100%. For example, the calibration factors may be adjusted by 10%, 25%, 50%, 75%, 90% or 95% of the difference between the determined weight and the transferred weight. In one embodiment, calibration is performed after each comparison of the transferred weight to the determined weight. In an independent embodiment, calibration is performed only if the comparison is outside a predetermined tolerance range. For example, calibration may be performed if the difference between the transferred weight and the determined weight is more than 1% of the determined weight, such as more than 2%, more than 5%, more than 10%, or more than 20% of the determined weight.

Individual feed ingredients and/or forms of the feed ingredient (e.g., powder, granules, liquid, etc.) may affect the determined weight of the feed ingredient in the loader bucket. Hence, separate calibration factors may be stored in the computer system for each feed ingredient.

An initial calibration may be performed by zeroing the weight with the bucket 191 raised to a first height within a user-defined optimum height range. A weight of known mass is placed in the bucket, and used to calibrate the loader digital scale indicator 120 at that height. The bucket subsequently is raised and/or lowered to several other heights within the height range, which includes the entire range of what a user might use when tipping or "feathering" feed ingredient from the bucket to reach a desired weight of the feed ingredient. Based on the differences from the known weight at the first height, the computer system stores multi-point adjustment factors for each height. Real-time weight measurements are based on linear interpolation between these known multi-point calibrated heights.

A weight of the feed ingredient in the bucket is determined by (a) receiving, using the loader digital scale indicator, pressure data from the hydraulic pressure transducer configured to sense hydraulic pressure in the lift cylinder when the bucket is at the lifted height; (b) determining, using the loader scale indicator, a weight indication of a combined weight of the quantity of the feed ingredient and the bucket; (c) measuring with a height position indicator a height of the bucket, when the bucket is at the lifted height, relative to a surface on which the loader is positioned; (d) measuring with a bucket position indicator a tip angle of the bucket relative to a horizontal bucket position in which a lower wall of the bucket is perpendicular to a direction of gravitational acceleration; (e) receiving, using a computer, measurement data comprising the weight indication from the loader digital scale indicator, height data from the height position indicator, and tip angle data from the bucket position indicator; and (f) calculating, using the computer and based at least in part on the measurement data and calibration data for the loader digital scale indicator, the height position indicator, the bucket position indicator, or any combination thereof, a determined weight of the quantity of the feed ingredient. In some embodiments, the bucket height is measured at an attachment point of the bucket to the lift arm. In certain embodiments, the loader comprises a second hydraulic pressure transducer configured to sense hydraulic pressure in a second lift cylinder of the bucket when the bucket is at the lifted height, and the method includes receiving, using the loader digital scale indicator, pressure data from the first hydraulic pressure transducer and the second hydraulic pressure transducer.

In any or all of the above embodiments, the method may further include measuring with a surface position indicator or the height position indicator a slope of the surface on which the loader is positioned; receiving, using the computer system, measurement data comprising slope data from the surface position indicator or the height position indicator; and calculating, using the computer system and based at least in part on the measurement data and calibration data for the loader digital scale indicator, the height position indicator, the surface position indicator, or any combination thereof, the determined weight of the quantity of the feed ingredient. In such embodiments, calibration comprises calibrating the loader digital scale indicator, the height position indicator, the surface position indicator, or any combination thereof.

In any or all of the above embodiments, the computer system may comprise a loader computer and a feed batching system computer, and the step of receiving, using the computer system, data from the feed batching system further comprises wirelessly receiving with the loader computer the data from the feed batching system computer. Alternatively, in any or all of the above embodiments, the computer system may comprise a feed batching system computer, and the step of receiving, using the computer system, measurement data comprises wirelessly receiving with the feed batching system data transmitted from the loader digital scale indicator, the height position indicator, the surface position indicator, the bucket position indicator, or any combination thereof. Alternatively, in any or all of the above embodiments, the computer system may comprise a loader computer, and the step of receiving using the computer system, data from the feed batching system further comprises wireless receiving with the loader computer the data from the feed scale digital indicator.

In any or all of the above embodiments, the method may further include comparing, using the computer system, the determined weight of the quantity of the feed ingredient in the bucket to a target weight of the feed ingredient. An indication of whether the weight of the feed ingredient is below, meets, or exceeds the target weight may be displayed to a user. In some embodiments, an alarm is generated if the determined weight of the quantity of the feed ingredient exceeds a predetermined tolerance level for deviation from the target weight. The alarm may be a visual alarm (e.g., a color change of a portion of the display), an audible alarm, or both a visual alarm and an audible alarm. In some embodiments, an indication of the determined weight of the feed ingredient in the bucket also is shown on the display. The indication may be a numerical representation of the weight and/or a color bar having a length that increases as the determined weight increases. In certain embodiments, the loader system may be deactivated for servicing if the determined weight exceeds the predetermined tolerance level for deviation from the target weight.

The method may further include calculating, using the computer system, a determined weight of the feed ingredient in the bucket at periodic time intervals to provide a plurality of determined weights; calculating, using the computer system, an average determined weight; and displaying on the loader bucket weight status bar an updated indication of the determined weight of the feed ingredient based on the average determined weight. In some embodiments, the computer system further receives an identity of the feed ingredient, e.g., from the feed batching system or from user input. The step of calculating the determined weight may further be based at least in part on the feed ingredient identity. Calibration also may be based at least in part on the feed ingredient identity.

In any or all of the above embodiments, the method may further include determining, using the computer system, whether the height of the bucket is within a linear calibration range; and generating, using the computer system, an alarm if the height of the bucket is outside the linear calibration range. The alarm may be a visual alarm, an audible alarm or a visual and audible alarm.

In any or all of the above embodiments, the method may further include receiving, using the computer system, a target weight for the feed ingredient. The target weight may be received from the feed batching system or from user input. In some embodiments, the method further includes calculating, using the computer system, a difference between the determined weight of the quantity of the feed ingredient and the target weight to provide a weight comparison; and determining, using the computer system, whether the weight comparison is within a predetermined tolerance range. If the weight comparison is within the predetermined tolerance range, the display may display instructions to transfer the feed ingredient from the loader bucket to the feed scale. If the weight comparison is outside the predetermined tolerance range, the display may display instructions to add a further quantity of the feed ingredient to the bucket if the weight is too low, or to remove a portion of the feed ingredient from the bucket if the weight is too high. In certain embodiments, the instructions may displayed as a color change of a portion of the display. Alternatively, or in addition, the display may show the difference between the determined weight of the quantity of the feed ingredient and the target weight.

In any or all of the above embodiments, a target feed scale weight may be determined, wherein the target feed scale weight is equal to a current weight of the feed scale plus a target weight of the feed ingredient. In some embodiments, a target transfer weight of the feed ingredient is also determined. The target transfer weight might be less than the target weight if more than one bucketful of the ingredient is required to reach the target feed scale weight. In certain embodiments, the target transfer weight is displayed on the display. The method may further include comparing the target transfer weight to the determined weight of the feed ingredient in the bucket.

If the target transfer weight is greater than the determined weight, the method may further comprise, after transferring the quantity of the feed ingredient from the bucket of the loader to the feed scale, calculating, using the computer system, a subsequent target transfer weight of the feed ingredient for a subsequent addition of the feed ingredient to the feed scale. The subsequent target transfer weight may displayed on the display.

If the target transfer weight is less than the determined weight, the method may further comprise removing a portion of the quantity of the feed ingredient from the bucket; determining, using the computer system, a subsequent weight of a remaining quantity of the feed ingredient in the bucket; comparing, using the computer system, the target transfer weight to the subsequent weight; and repeating the steps of removing a portion of the quantity of the feed ingredient and determining a subsequent weight of a remaining quantity of the feed ingredient in the bucket until a comparison of the target transfer weight to the subsequent weight is within a predetermined tolerance range. In some embodiments, removing a portion of the feed ingredient from the bucket includes determining, using the computer system, a tip angle for the bucket, wherein the bucket when tipped to the tip angle will retain a quantity of the feed ingredient having a weight within the predetermined tolerance range; displaying on the display instructions to tip the bucket to the determined tip angle; and tipping the bucket to the determined tip angle. In any of the foregoing embodiments, the method may further include displaying on the display instructions to stop removing portions of the quantity of the feed ingredient from the bucket when the comparison is within the predetermined tolerance range. In certain embodiments, the instructions comprise a change in color of a portion of the display. After a portion of the feed ingredient has been removed from the bucket, the method may further comprise waiting a predetermined loader settling period of time, determining a final weight of the remaining quantity of the feed ingredient in the bucket, and subsequently transferring the remaining quantity of the feed ingredient from the bucket of the loader to the feed scale.

In some embodiments, the method further includes determining an end weight of the feed scale after transferring the quantity of the feed ingredient to the feed scale, and calculating, using the computer system, a difference between the target feed scale weight and the end weight. An alarm (e.g., a visual and/or audible alarm) may be generated if the difference between the target feed scale weight and the end weight exceeds a predetermined tolerance range. An end weight may be determined by waiting for a predetermined settling period of time to elapse after transferring the quantity of the feed ingredient to the feed scale; subsequently obtaining a plurality of gross feed scale weight measurements at periodic time intervals during a predetermined scale averaging period of time; and calculating, using the computer system, the end weight based on an average of the plurality of gross feed scale weight measurements.

After determination of the end weight, the computer system may further calculate an updated target transfer weight, wherein the updated target transfer weight is the difference between the target feed scale weight and the end weight of the feed scale. The updated target transfer weight then is displayed on the display.

In certain embodiments, a gross feed scale weight is obtained prior to initiating the predetermined settling period of time, and the gross feed scale weight is compared to a cutoff weight, wherein the cutoff weight is equal to a target gross feed scale weight minus the determined weight of the quantity of the feed ingredient in the bucket of the loader. If the gross feed scale weight is greater than the cutoff weight, the predetermined settling period of time is initiated. If the gross feed scale weight is less than or equal to the cutoff weight, the predetermined settling period of time may be initiated after receiving, using the computer system, user input indication completion of feed ingredient transfer to the scale. If the gross scale weight is changing over time, additional gross feed scale weights may be obtained until the weight stabilizes.

Figure 3A:
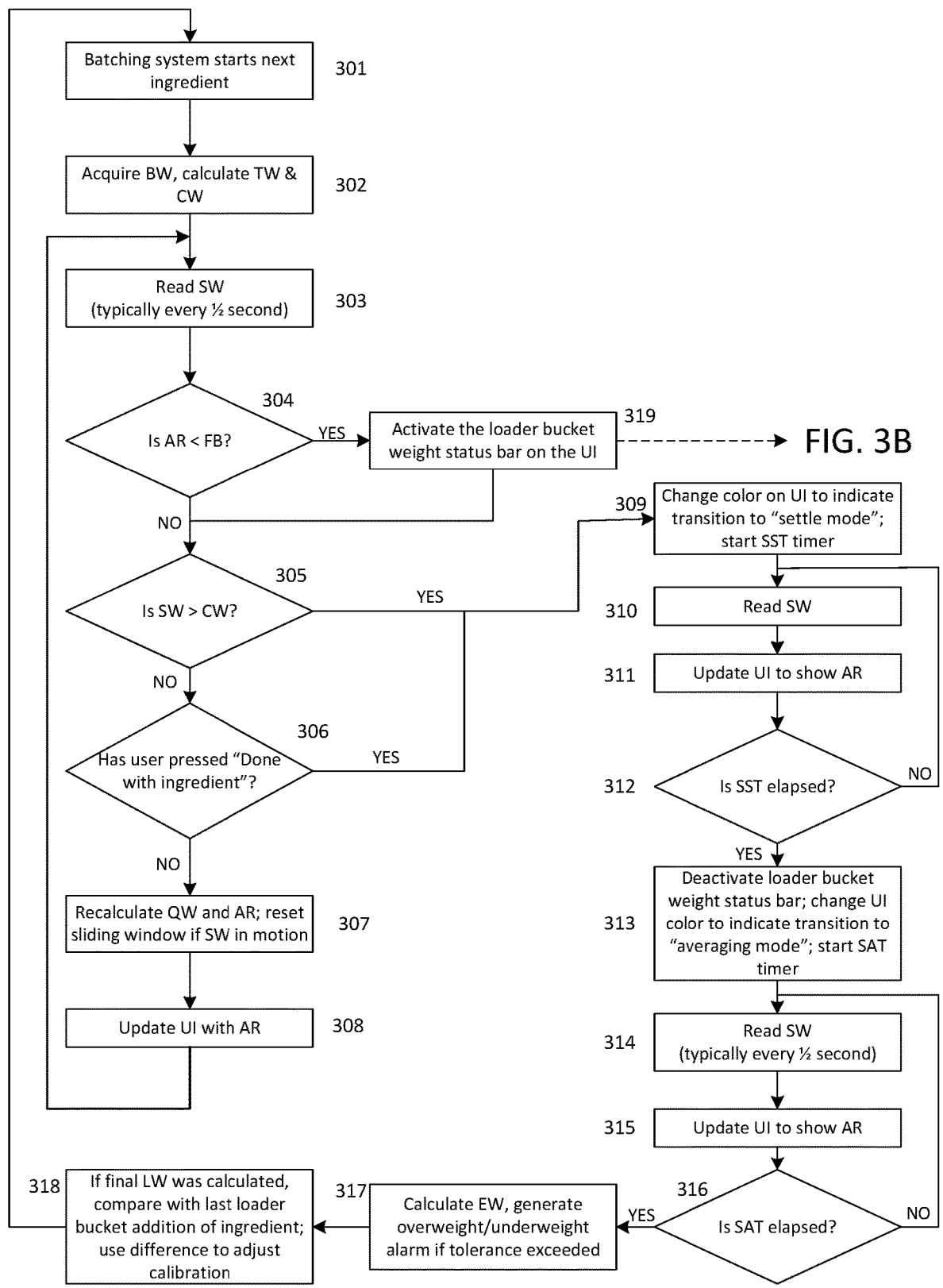
FIGS. 3A and 3B are flow diagrams of an exemplary method for weighing animal feed ingredients using the system of FIG. 1.
Figures 3A, 3B:
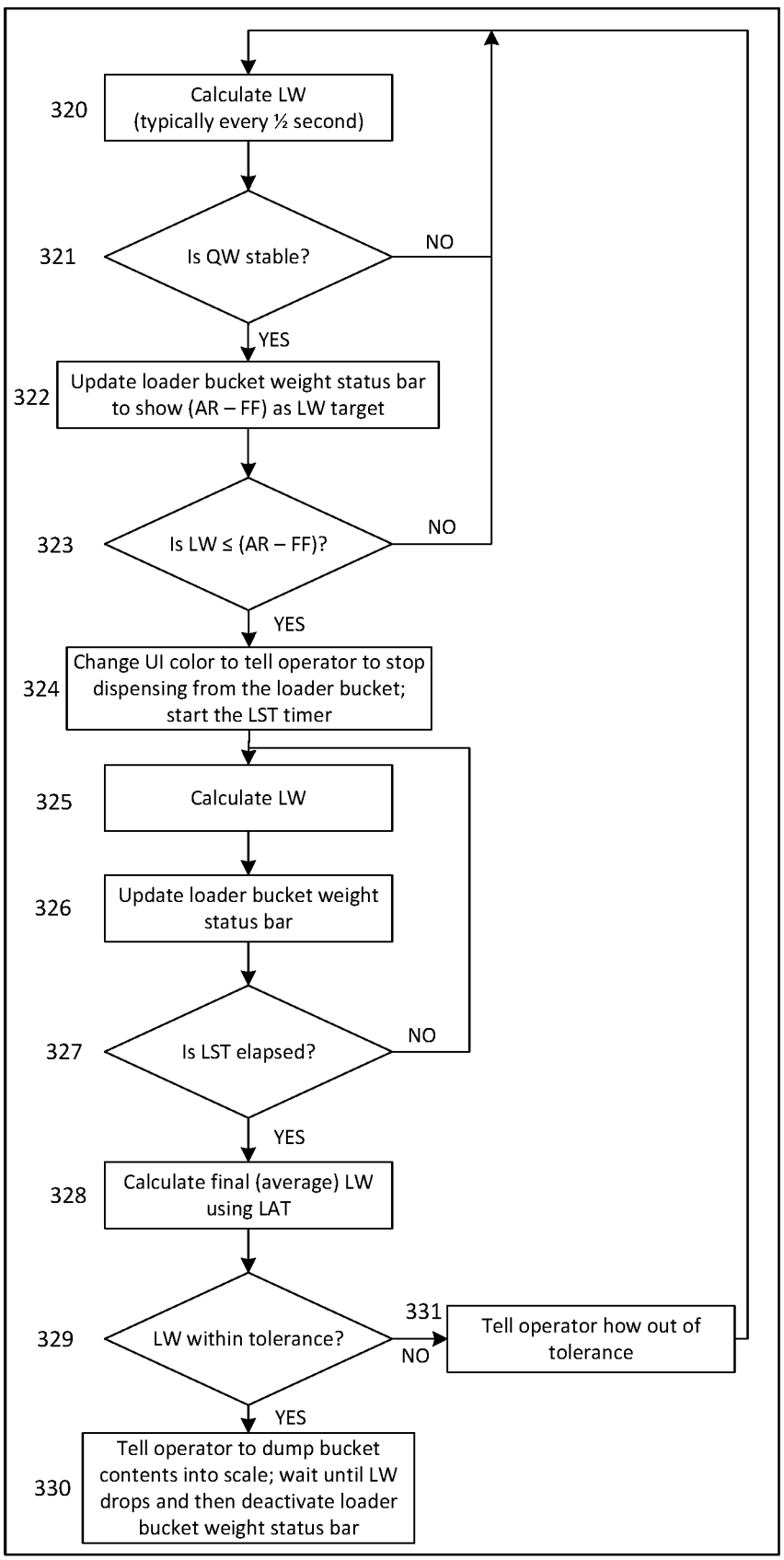

FIGS. 3A-3B are flow diagrams showing aspects of an exemplary computer algorithm for accurately weighing feed ingredients using embodiments of the disclosed system. While exemplary aspects of the algorithm are shown, it will be understood that some steps may be optional and that some functions may be performed in an alternate but comparable manner. The algorithm is activated when the batching system starts the next ingredient (301). A beginning weight (BW) of the scale is obtained, and a target weight (TW) and cutoff weight (CW) are calculated (302). The BW may be the ending weight (EW) of the scale after the previous ingredient was added, or the empty weight of the scale if the ingredient is the first ingredient to be added. The target weight (TW) is the scale weight (SW) at which the desired amount of the ingredient has been added to the scale. The cutoff weight (CW) is equal to TW–FF (free fall weight). The FF is the anticipated amount of the ingredient that will be added to the scale when the user/operator stops dispensing from the loader bucket. The FF may be the determined weight of the feed ingredient in the loader bucket. The SW is read periodically (303) by the feed scale digital indicator. In some embodiments, SW is read every ½ second. An amount remaining (AR) is calculated, where AR=TW–SW, and the AR is compared to a weight of a full bucket (FB) of the loader (304).

If AR is greater than or equal to FB, then the algorithm determines whether SW>CW (305). If SW is not greater than CW, the algorithm queries whether the user has provided an indication of being done with the ingredient (306), e.g., by pressing a "Done with ingredient" button on a touchscreen display in the cab. If the user is not done with the ingredient, a quiet weight (QW) and AR are recalculated (307). The QW is an average of a "sliding window" of SW values acquired between additions of the feed ingredient to the scale. If SW is in motion, the sliding window is reset (307). The display/user interface (UI) is updated with the recalculated AR (308), and the algorithm cycles back to step 303.

If SW>CW at step 305, or if the user has pressed "Done with ingredient" at step 306, the algorithm transitions to "settle mode" and a scale settle time (SST) timer is initiated (309). The color of a portion of the UI also may be changed to indicate the change to settle mode. While the SST is running, the SW is read (310), and the UI is updated to show the AR (311). The algorithm requires whether the SST has elapsed (312). If SST is not completed, steps 310-312 are repeated.

When SST has elapsed, the loader bucket weight status bar on the UI is deactivated, and a scale average time (SAT) timer is initiated (313); the color of a portion of the UI may be changed to indicate the transition to averaging mode. While the SAT is running, the SW is read (314), typically every ½ second, and the UI is updated to show the AR (315). The algorithm requires whether the SAT has elapsed (316). If SAT is not completed, steps 314-316 are repeated.

When SAT has elapsed, the ending weight (EW) of the scale is calculated and compared to TW, and an overweight-underweight alarm is generated if a predetermined tolerance is exceeded (317). If a final loader weight (the net weight of the feed ingredient in the bucket) has been calculated, it is compared with the last loader bucket addition of the ingredient, and the difference is used to adjust calibration of one or more loader components (318) for that ingredient, such as the loader digital scale indicator, the height position indicator, the surface position indicator, the bucket position indicator, or any combination thereof. Calibration factors for data received from the loader components may be adjusted by [x]% where [x] can be set for each individual ingredient. The algorithm then resets to start the next ingredient (301).

At step 304, if the AR is less than FB (i.e., if the amount of ingredient needed is less than a full bucket of the ingredient), the loader bucket weight status bar on the UI is activated (319) and the amount of the ingredient in the loader bucket is adjusted as shown in the flow chart of FIG. 3B.

The LW (i.e., the determined weight of the ingredient in the bucket) is calculated, typically every ½ second (320). The algorithm queries whether the QW is stable (321). If the weight is not stable, LW continues to be measured every ½ second (320) until stability is reached. When QW is stable, the loader bucket weight status bar on the display is updated to show (AR−FF) as the LW target (322). The algorithm queries whether LW≤(AR−FF) (323). If LW>(AR−FF), the user/operator removes a portion of the ingredient from the bucket, e.g., by tipping the bucket to return some of the feed ingredient to the feed ingredient pile, and the algorithm repeats steps (320-323). When LW≤(AR−FF), the UI color is changed to tell the operator to stop dispensing ingredient from the loader bucket and a loader settle time (LST) timer is initiated (324). LW is calculated (325), and the loader bucket weight status bar on the UI is updated (326). The algorithm queries whether LST has elapsed (327). If LST is not complete, steps 325-327 are repeated.

When LST has elapsed, a final average LW is calculated using the LW values and the loader average time (LAT) (328). LAT is the number of seconds over which LW values are averaged to calculate the final average LW. The algorithm queries whether the final LW is within a predetermined tolerance range (329). If LW is within the predetermined tolerance range, the operator is instructed (i.e., by instructions or a color change displayed on the UI) to dump the bucket contents onto the feed scale and, after the LW has dropped, the loader bucket weight status bar on the UI is deactivated (330).

If the final LW is not within the predetermined tolerance range, an indication of how far the LW deviates from the tolerance is displayed to the operator (331), and the algorithm repeats from step 320.

IV. Display/User Interface

Embodiments of the disclosed system include a display 170 (FIGS. 1, 4). Display 170 may have any configuration suitable to display feed ingredient/feed ration information, measurement data, instructions, and/or color changes to a user. In some embodiments, display 170 is a touchscreen display/user interface and is configured to accept user input.

In the representative embodiment shown in FIG. 4, the display 170 includes a loader bucket weight status bar 171 and an instruction bar 172. The loader bucket weight status bar 171 may further include a stop marker 173 and a target marker 174. The loader bucket weight status bar 171 may display a target weight of feed ingredient to be added to the bucket and a determined amount of feed ingredient in the bucket. The loader weight status bar 171 also may progressively change color from left to right as the weight of feed ingredient in the loader bucket increases. When the color change reaches the stop marker 173, the user may stop adding feed ingredient to the bucket. In some embodiments, when the LW subsequently stabilizes, the color change will have advanced slightly beyond the stop marker 173 and will be near the target marker 174. While the bucket is moving (i.e., being raised or lowered), the loader bucket weight status bar 171 provides information regarding the bucket's movement or position.

In some embodiments, the display 170 further includes an ingredient identifier and weight status bar 175. The ingredient identifier and weight status bar 175 displays a feed ingredient identifier, an amount of the feed ingredient already added to the feed scale, and a total amount of the feed ingredient required for the feed ration batch. The ingredient and weight status bar 175 may further include a stop marker 176 and a target marker 177. The ingredient identifier and weight status bar 175 may progressively change color from left to right as the weight of the feed ingredient added to the feed scale approaches the total amount of the feed ingredient required. When the color change reaches the stop marker 176, the user may stop dispensing the feed ingredient from the bucket to the feed scale. In some embodiments, when the feed scale weight subsequently stabilizes, the color change will have advanced slightly beyond the stop marker 176 and will be near the target marker 177.

The display 170 may further include a panel 178 displaying information related to the feed ration batch, such as a batch identification, load identification, time and date, etc. The display 170 optionally may include additional buttons and/or information panels as desired. For example, the display may include an exit button, a schedule button, an alarm button/display, a button allowing the user to view information from the feed scale batching system, buttons linking to other systems and/or programs, etc.

Figure 5A:
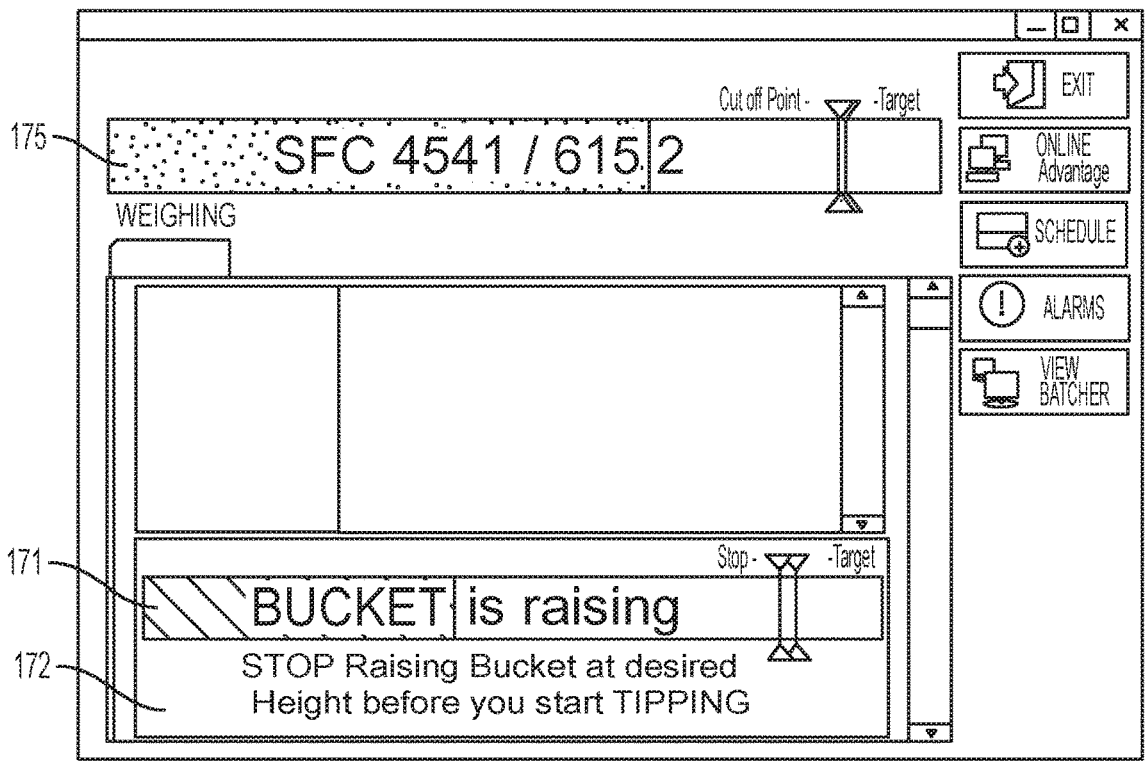
FIGS. 5A-5C are representative screenshot diagrams of an exemplary display showing instructions regarding a height position of a bucket on a loader when the bucket is being raised (FIG. 5A), when the bucket is too low (FIG. 5B), or when the bucket is too high (FIG. 5C).
Figure 5B:
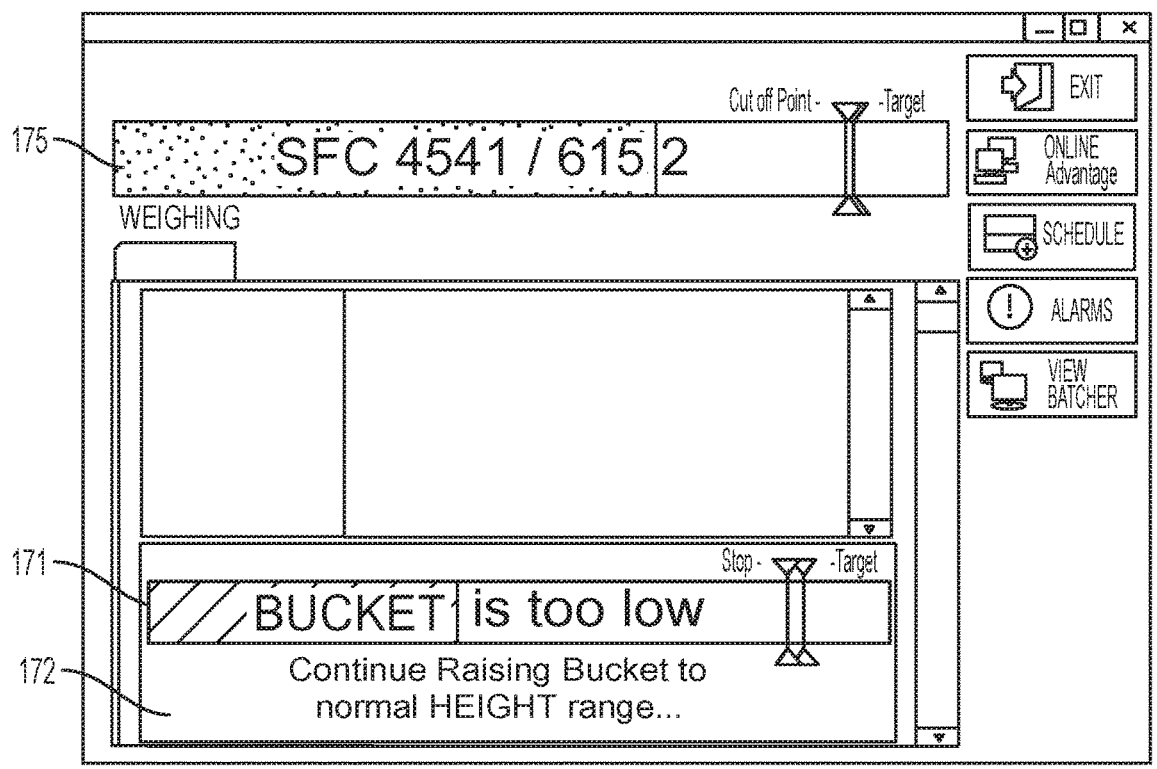
Figure 5C:
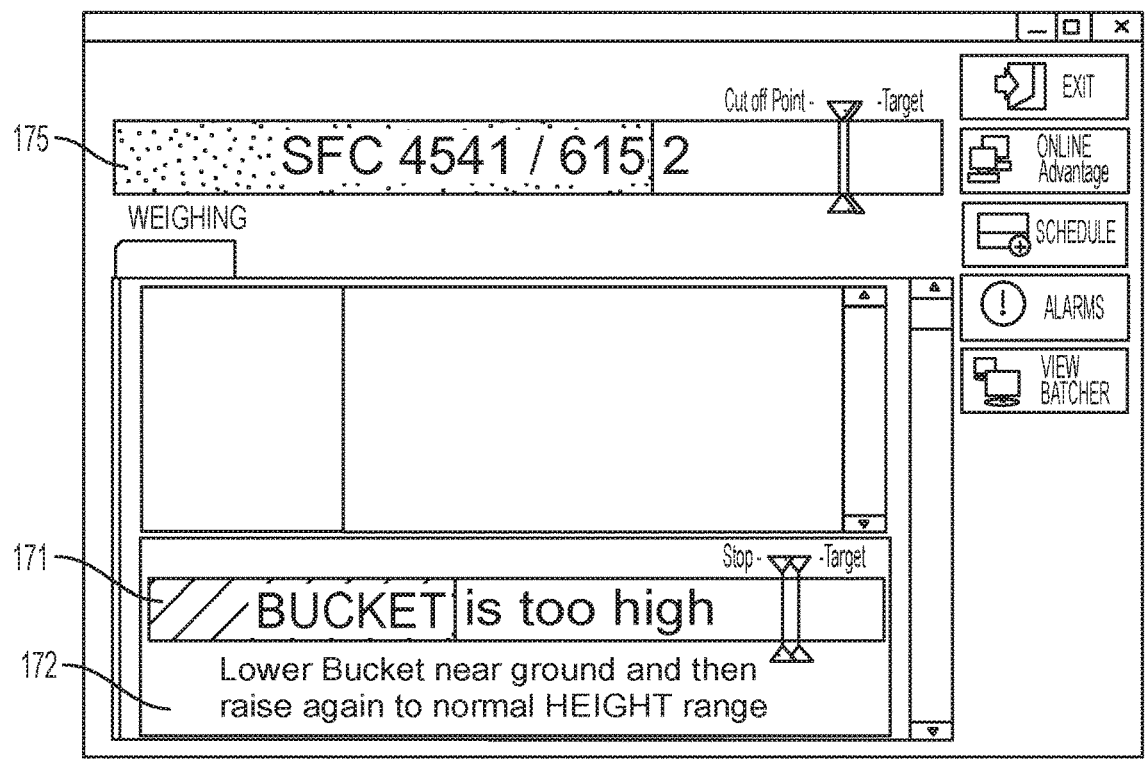
Figure 6A:
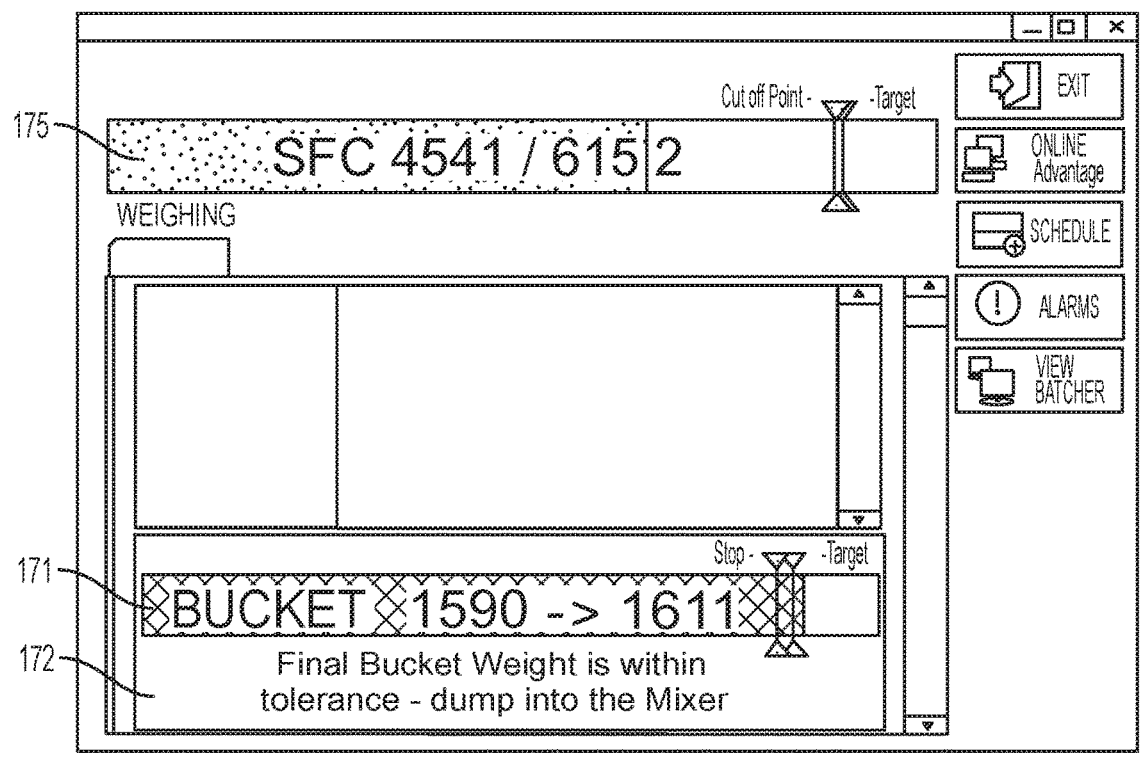
FIGS. 6A-6B are representative screenshot diagrams of an exemplary display showing a feed ingredient weight within a predetermined tolerance and instructions telling a user to dispense the feed ingredient.
Figure 6B:
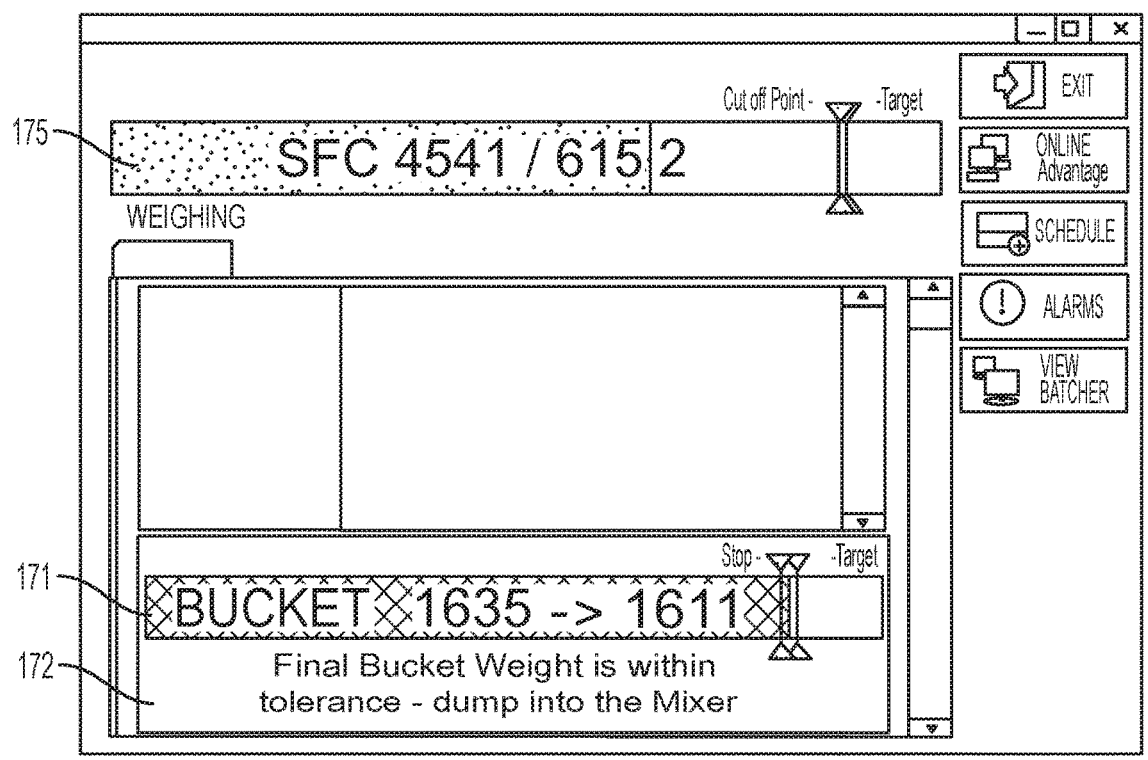
Figure 7A:
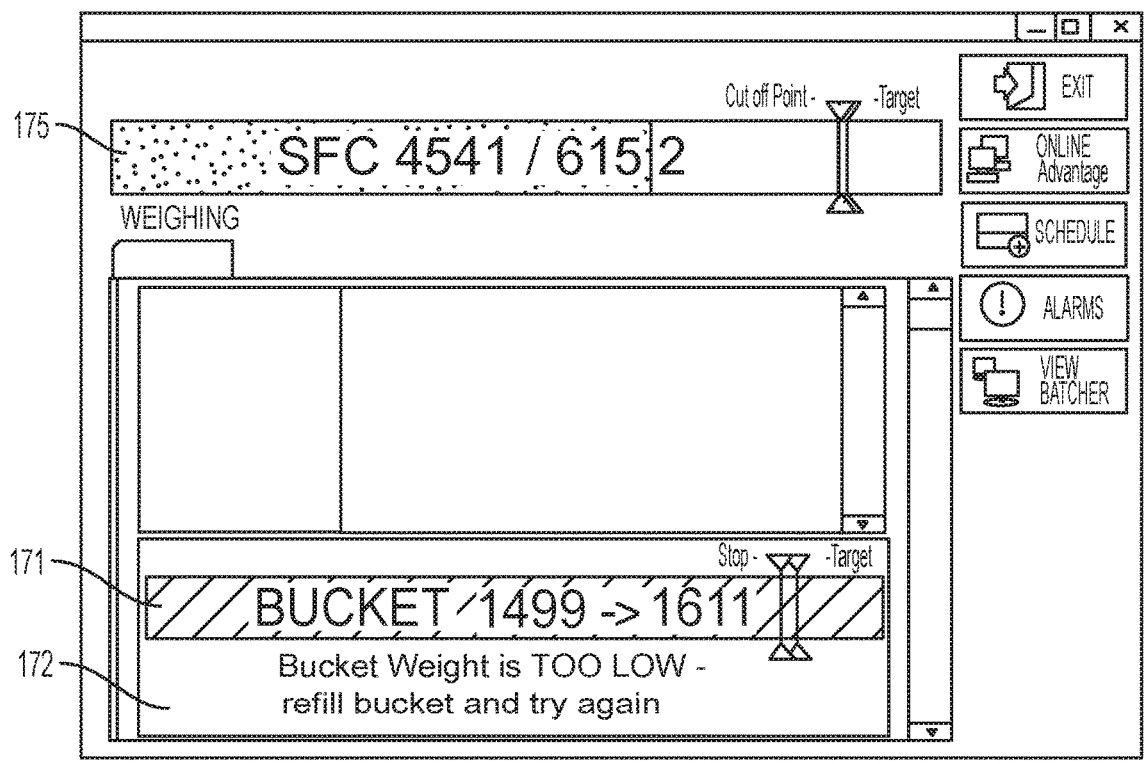
FIGS. 7A and 7B are representative screenshot diagrams of an exemplary display showing a feed ingredient weight outside a predetermined tolerance and instructions telling a user to refill the bucket (FIG. 7A) or remove a portion of the feed ingredient from the bucket (FIG. 7B).
Figure 7B:
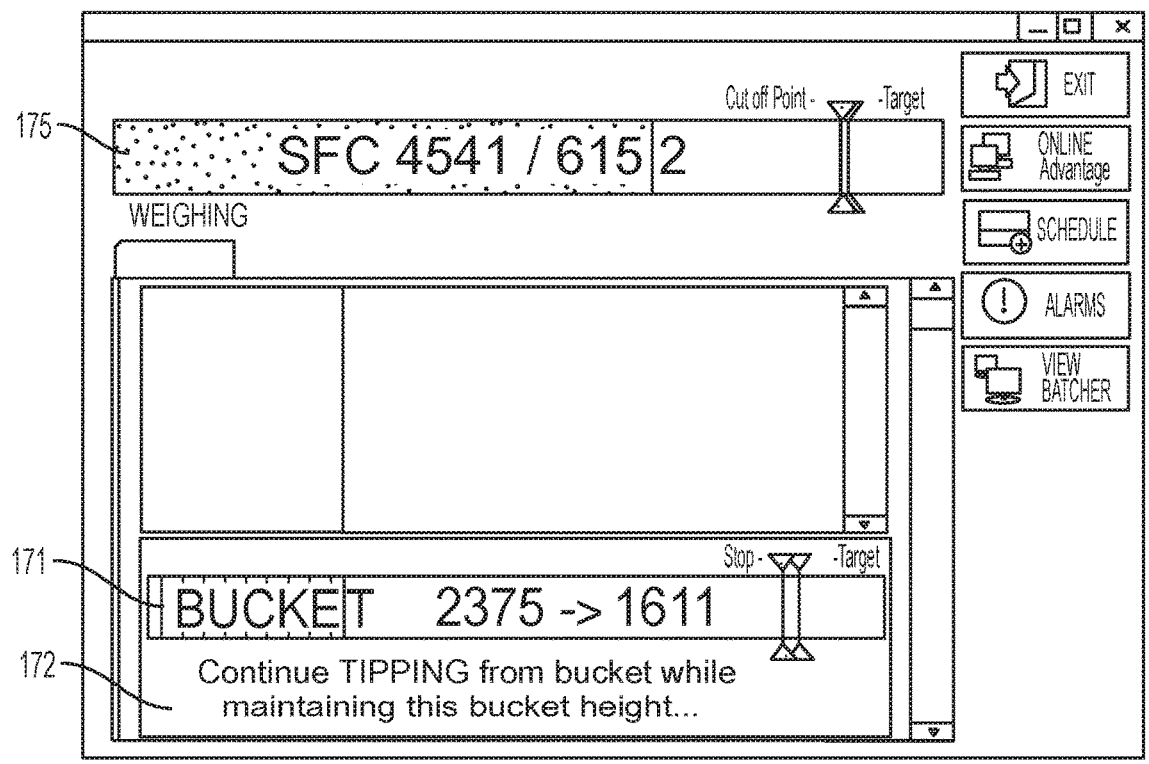
Figure 7C:
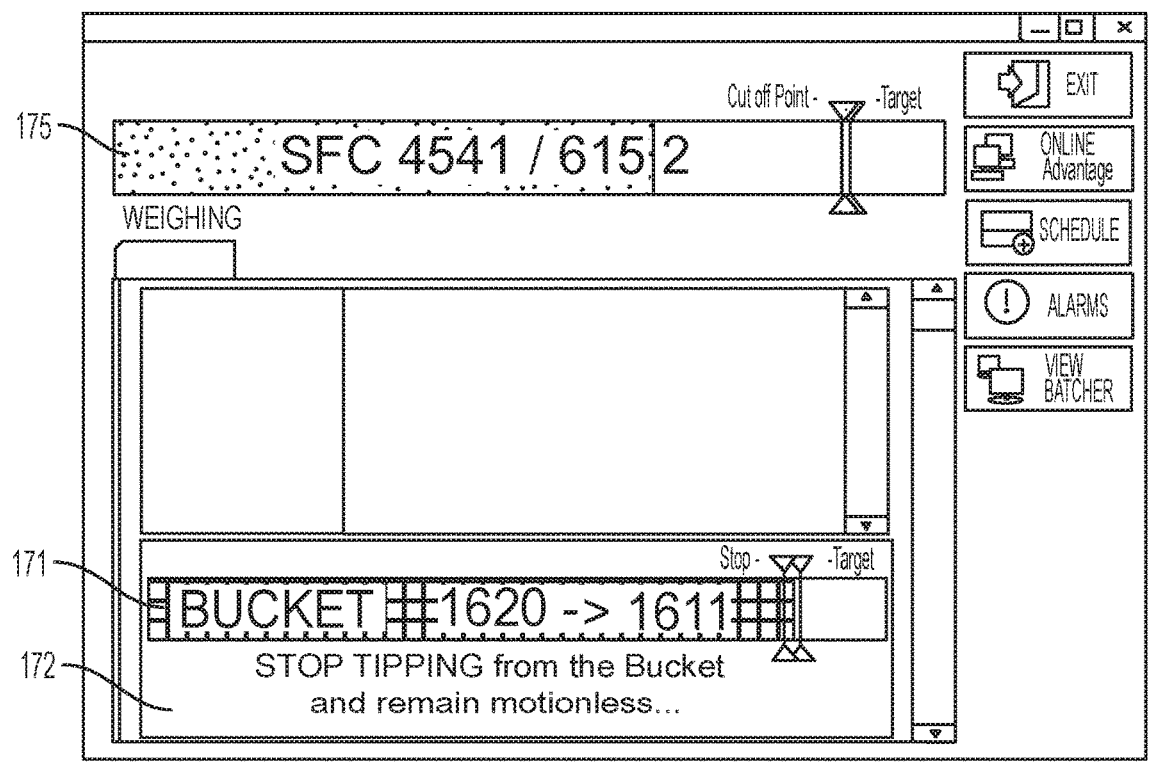
FIG. 7C is a representative screenshot diagram of an exemplary display showing a feed ingredient weight within a predetermined tolerance and instructions telling a user to stop removing feed ingredient from the bucket.

FIGS. 5-7 are illustrative screen shots showing the display during various portions of the disclosed method. FIGS. 5A-5C show exemplary displays when the loader bucket is in motion (FIG. 5A), or when the bucket position is too low (FIG. 5B) or too high (FIG. 5C) for accurate measurements of the bucket height and/or hydraulic lift cylinder pressure. Calibrations for the bucket height and/or hydraulic lift cylinder pressure may only be linear over a certain range, and therefore it is advantageous to instruct the user to adjust the bucket position to within the linear range. The bucket status is shown in the loader bucket weight status bar 171, and the color may indicate whether the bucket is moving or whether the bucket position is outside a preferred height range. For example, in FIGS. 7B and 7C, the loader weight status bar 171 may be colored red to show that the bucket position is outside the preferred height range. The instruction bar 172 provides additional instruction to the user regarding the bucket position. While the bucket is moving, the instruction bar 172 may display instructions to stop raising the bucket at the desired height before beginning to dispense the feed ingredient from the bucket (FIG. 5A). When the bucket is too low or too high, the instruction bar 172 may display instructions to continue raising the bucket (FIG. 5B) or to lower the bucket and raise again to the preferred height range (FIG. 5C). The ingredient identifier and weight status bar 175 shows a feed identifier (e.g., SFC), an amount of the feed ingredient already added to the feed scale (e.g., 4541 lbs) and a total amount of the feed ingredient needed (e.g., 6152 lbs).

FIGS. 6A and 6B are illustrative screen shots showing that the determined weight of the feed ingredient in the bucket is within a predetermined tolerance range. In each case, the color change on the loader bucket weight status bar 171 has progressed past the stop marker 173 and is within a predetermined tolerance of the target marker 174. The loader bucket weight status bar 171 also displays a target weight (e.g., 1611 lbs) for the feed ingredient in the bucket and the actual weight (e.g., 1590 lbs (FIG. 6A), 1635 lbs (FIG. 6B). The target weight of 1611 lbs in these exemplary screen shots is the difference between the total amount of the feed ingredient needed (e.g., 6152 lbs) and the amount of the feed ingredient already added to the feed scale (e.g., 4541 lbs) as shown in the ingredient identifier and weight status bar 175.

FIGS. 7A-7C are illustrative screen shots showing that the determined weight of the feed ingredient in the bucket is outside a predetermined tolerance range. The loader bucket weight status bar 171 of FIG. 7A shows that the weight of the feed ingredient within the bucket is too low. The status bar 171 has changed color as a visual warning to the user that the weight is too low. The instruction bar 172 displays instructions telling the user to add more of the feed ingredient to the bucket. In FIG. 7B, the weight in the bucket is too high, and the instruction bar 172 displays instructions telling the user to continue tipping ingredient from the bucket while maintaining the bucket height. When the determined weight of the feed ingredient in the bucket approaches the target weight (FIG. 7C), the instruction bar 172 displays instructions telling the user to stop tipping from the bucket and remain motionless (to allow a final LW to be determined). The loader bucket weight status bar 171 may change color when the determined weight of the feed ingredient in the bucket approaches the target weight. In each of FIGS. 7A-7C, the loader bucket weight status bar 171 also displays the target weight for the feed ingredient in the bucket (e.g., 1611 lbs) and the actual weight in the bucket (1449, 2375, and 1620 lbs, respectively).

Embodiments of the disclosed system and method provide several advantages over existing systems and methods for weighing feed ingredients. For example, comparisons of the determined weight of the feed ingredient in the loader bucket to the actual weight of feed ingredient transferred to the scale allows for periodic and/or continuous calibration of the loader components, thereby increasing accuracy of subsequent measurements of the determined weight. Because the system can store calibration factors for each feed ingredient, the system is sufficiently accurate that a user can confidently transfer the entire contents of the loader bucket onto the feed scale without exceeding the target weight or discovering that additional feed ingredient is needed. Accuracy is further increased by measuring both the height of the bucket and the slope of the surface on which the loader is positioned, and factoring those measurements into the weight determination. In some embodiments, the determined weight of the feed ingredient in the loader bucket is accurate within a range of ±10%, such as ±5%, ±3%, ±2%, or even ±1%. For example, a 2,000 lb load of a feed ingredient in the bucket may be accurately measured to within 100 lbs or even within 50 lbs. In certain embodiments, the weight of the feed ingredient in the bucket can be determined in 1-5 lb increments. Advantageously, the system communicates wirelessly with the feed batching system. The system includes a display in the loader cab, which allows the user to see data from both the loader system and the feed batching system. For example, the display may show the weight of the feed ingredient in the bucket as well as the weight of the feed ingredient previously added to the feed scale and/or the target weight to be reached.

V. Illustrative Embodiments

Several illustrative embodiments are described in the following numbered paragraphs:

1. A system, comprising: a computer system configured to (a) receive data from a loader digital scale indicator, the data providing an indication of a combined weight of a bucket of a loader and a feed ingredient therein, (b) receive data from a height position indicator, the data indicating a height of the bucket relative to a surface on which the loader is positioned, (c) receive data from a bucket position indicator, the data indicating a tip angle of the bucket relative to a horizontal bucket position in which a lower wall of the bucket is perpendicular to a direction of gravitational acceleration, (d) determine, based at least in part on (i) the data received from the loader digital scale indicator, the height position indicator, and the bucket position indicator, and (ii) stored calibration data comprising combinations of digital scale data and position indicator data, a determined weight of the quantity of the feed ingredient in the bucket, (e) receive data from a feed batching system comprising a feed scale and a feed scale digital scale indicator, wherein the data received includes at least a transferred weight of the quantity of the feed ingredient transferred from the bucket to the feed scale, (f) compare the transferred weight to the determined weight to provide a comparison, and (g) optionally, use the comparison as a data calibration factor for data received from the loader digital scale indicator, the height position indicator, the bucket position indicator, or any combination thereof, to provide increased accuracy of a subsequent determined weight of a subsequent quantity of the feed ingredient in the bucket.

2. The system of paragraph 1, further comprising: a first hydraulic pressure transducer configured to sense hydraulic pressure in a hydraulic lift cylinder of a lifting arm of the bucket; a loader digital scale indicator configured to receive pressure data from the first hydraulic pressure transducer and provide the indication of the combined weight of the bucket and the quantity of the feed ingredient therein based on the pressure data; a height position indicator configured to measure height of the bucket relative to a surface on which the loader is positioned; and a bucket position indicator configured to measure a tip angle of the bucket relative to a horizontal bucket position in which a lower wall of the bucket is perpendicular to a direction of gravitational acceleration.

3. The system of paragraph 2, wherein the height position indicator is positioned on a lift arm of the bucket.

4. The system of paragraph 2 or paragraph 3, wherein the height position indicator is an inclinometer, a spring-loaded position sensor, or a lift cylinder linear displacement transducer.

5. The system of paragraph 4, wherein the height position indicator is an inclinometer with a two-wire output, and the height position indicator is also configured to measure a slope of the surface on which the loader is positioned, wherein the computer system further is configured to receive slope data from the height position indicator.

6. The system of any one of paragraphs 1-5, further comprising a surface position indicator configured to measure a slope of the surface on which the loader is positioned, wherein the computer system further is configured to receive slope data from the surface position indicator.

7. The system of paragraph 6, wherein the surface position indicator is positioned on a cab of the loader.

8. The system of paragraph 6 or paragraph 7, wherein the surface position indicator is an inclinometer.

9. The system of any one of paragraphs 6-8, wherein the computer system further is configured to optionally calibrate the slope data received from the surface position indicator.

10. The system of any one of paragraphs 1-9, wherein the bucket position indicator is positioned on an outer surface of the bucket.

11. The system of paragraph 10, wherein the bucket position indicator is an inclinometer, a spring-loaded position sensor, or a tilt cylinder linear displacement transducer.

12. The system of any one of paragraphs 1-11, further comprising a second hydraulic pressure transducer configured to measure hydraulic pressure in a second hydraulic lift cylinder of a second lifting arm of the bucket, wherein the digital scale indicator further is configured to receive pressure data from the second hydraulic pressure transducer and provide an indication of a combined weight of the bucket and a quantity of a feed ingredient therein based on the pressure data from the first and second hydraulic pressure transducers.

13. The system of any one of paragraphs 1-12, wherein the computer system comprises a loader computer, a feed batching system computer, or a loader computer and a feed batching system computer.

14. The system of any one of paragraphs 1-13, further comprising a wireless data transceiver configured to transmit data (i) between the feed batching system computer and the loader computer, (ii) from the feed scale digital indicator to the loader computer, or (iii) from the loader digital scale indicator, the height position indicator, the bucket position indicator, the surface position indicator, or any combination thereof, to the feed batching system computer.

15. The system of paragraph 14, wherein the wireless data transceiver is a wireless transceiver that transmits and receives radio waves or a free-space optical communication transceiver.

16. The system of any one of paragraphs 1-15, further comprising a display within a cab of the loader, wherein the display is configured to display data output from the computer system.

17. The system of paragraph 16, wherein the display is a touchscreen display and the display further is configured to transmit user input to the computer system.

18. The system of any one of paragraphs 1-17, further comprising an input/output module configured to receive data from the height position indicator, wherein data is transmitted from the height position indicator to the computer system via the input/output module.

19. A method, comprising: determining a weight of a feed ingredient in a bucket of a loader by: calculating, using the system of any one of paragraphs 1-18, and based at least in part on measurement data and calibration data for the loader digital scale indicator, the height position indicator, and the bucket position indicator, a determined weight of the quantity of the feed ingredient in the bucket; transferring the quantity of the feed ingredient from the bucket of the loader to a feed scale; receiving, using the computer system, data from the feed batching system, wherein the data received from the feed batching system includes at least a transferred weight of the feed ingredient transferred from the bucket to the feed scale; comparing, using the computer system, the transferred weight to the determined weight to provide a comparison; and optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

20. A method, comprising: loading a quantity of a feed ingredient into a bucket of a loader, the loader comprising a display in a cab of the loader for receiving and displaying information to a user of the loader; lifting, with a lift arm comprising a hydraulic lift cylinder, the bucket of the loader to a lifted height; determining a weight of the feed ingredient in the bucket of the loader by (i) receiving, using a loader digital scale indicator, pressure data from a first hydraulic pressure transducer configured to sense hydraulic pressure in a lift cylinder of the bucket when the bucket is at the lifted height, (ii) determining, using the loader digital scale indicator, a weight indication of a combined weight of the quantity of the feed ingredient and the bucket, (iii) measuring with a height position indicator a height of the bucket, when the bucket is at the lifted height, relative to a surface on which the loader is positioned, (iv) measuring with a bucket position indicator a tip angle of the bucket relative to a horizontal bucket position in which a lower wall of the bucket is perpendicular to a direction of gravitational acceleration, (v) receiving, using a computer system, measurement data comprising the weight indication from the loader digital scale indicator, height data from the height position indicator, and tip angle data from the bucket position indicator, and (vi) calculating, using the computer system and based at least in part on the measurement data and calibration data for the loader digital scale indicator, the height position indicator, and the bucket position indicator, a determined weight of the quantity of the feed ingredient in the bucket; transferring the quantity of the feed ingredient from the bucket of the loader to a feed scale; receiving, using the computer system, data from a feed batching system comprising the feed scale and a feed scale digital scale indicator, wherein the data received includes at least a transferred weight of the feed ingredient transferred from the bucket to the feed scale; comparing, using the computer system, the transferred weight to the determined weight to provide a comparison; and optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

21. The method of paragraph 19 or paragraph 20, wherein calibration is performed after each comparison.

22. The method of paragraph 19 or paragraph 20, wherein the comparison is the difference between the transferred weight and the determined weight, and calibration is performed if the comparison is outside a predetermined tolerance range.

23. The method of any one of paragraphs 20-22, wherein the height of the bucket is measured at an attachment point of the bucket to a lift arm of the loader.

24. The method of any one of paragraphs 20-23, further comprising: measuring with a surface position indicator or the height position indicator a slope of the surface on which the loader is positioned; receiving, using the computer system, measurement data comprising slope data from the surface position indicator or the height position indicator; and calculating, using the computer system and based at least in part on the measurement data and calibration data for the loader digital scale indicator, the height position indicator, the bucket position indicator, and the surface position indicator, the determined weight of the quantity of the feed ingredient.

25. The method of paragraph 24, wherein the step of calibrating comprises calibrating data received from the loader digital scale indicator, the height position indicator, the bucket position indicator, the surface position indicator, or any combination thereof.

26. The method of any one of paragraphs 20-25, wherein the loader comprises a second hydraulic pressure transducer configured to sense hydraulic pressure in a second lift cylinder of the bucket when the bucket is at the lifted height, the method further comprising receiving, using the loader digital scale indicator, pressure data from the first hydraulic pressure transducer and the second hydraulic pressure transducer.

27. The method of any one of paragraphs 19-26, wherein the computer system comprises a loader computer and a feed batching system computer, and wherein the step of receiving, using the computer system, data from the feed batching system further comprises wirelessly receiving with the loader computer the data from the feed batching system computer.

28. The method of any one of paragraphs 19-26, wherein the computer system comprises a feed batching system computer, and wherein the step of receiving, using the computer system, measurement data comprises wirelessly receiving with the feed batching system computer measurement data transmitted from the loader digital scale indicator, the height position indicator, the surface position indicator, the bucket position indicator, or any combination thereof.

29. The method of any one of paragraphs 19-28, further comprising comparing, using the computer system, the determined weight of the quantity of the feed ingredient in the bucket to a target weight of the feed ingredient to provide a comparison.

30. The method of paragraph 29, further comprising displaying, based on the comparison, on the display an indication of whether the weight of the feed ingredient is below, meets, or exceeds the target weight.

31. The method of paragraph 29 or paragraph 30, further comprising generating an alarm if the determined weight of the quantity of the feed ingredient exceeds a predetermined tolerance level for deviation from the target weight.

32. The method of paragraph 31, wherein the alarm is an audible alarm, a visible alarm, or a visual and audible alarm.

33. The method of any one of paragraphs 19-32, wherein the display is a touchscreen display that is configured to (i) receive and display data output from the computer, and (ii) transmit user input to the computer.

34. The method of paragraph 33, wherein the display further is configured to display a loader bucket weight status bar.

35. The method of paragraph 33 or paragraph 34, further comprising displaying on the loader bucket weight status bar an indication of the determined weight of the quantity of the feed ingredient.

36. The method of paragraph 35, further comprising: calculating, using the computer system, a determined weight of the quantity of the feed ingredient at periodic time intervals to provide a plurality of determined weights; calculating, using the computer system, an average determined weight; and displaying on the loader bucket weight status bar an updated indication of the determined weight of the quantity of the feed ingredient based on the average determined weight.

37. The method of any one of paragraphs 19-36, further comprising receiving, using the computer system, an identity of the feed ingredient.

38. The method of paragraph 37, wherein the step of calculating the determined weight of the quantity of the feed ingredient is further based at least in part on the identity of the feed ingredient.

39. The method of paragraph 37 or paragraph 38, wherein the step of calibrating the loader digital scale indicator, the height position indicator, the bucket position indicator, or any combination thereof, is further based at least in part on the identity of the feed ingredient.

40. The method of any one of paragraphs 19-39, further comprising: determining, using the computer system, whether the height of the bucket is within a linear calibration range; and generating, using the computer system, an alarm if the height of the bucket is outside the linear calibration range.

41. The method of paragraph 40, wherein the alarm is a visual alarm, an audible alarm, or a visual and audible alarm.

42. The method of any one of paragraphs 19-41, further comprising receiving, using the computer system, a target weight for the feed ingredient.

43. The method of paragraph 42, further comprising: calculating, using the computer system, a difference between the determined weight of the quantity of the feed ingredient and the target weight to provide a weight comparison; and determining, using the computer system, whether the weight comparison is within a predetermined tolerance range.

44. The method of paragraph 43, further comprising displaying on the display (i) instructions to transfer the quantity of the feed ingredient from the bucket of the loader to the feed scale if the weight comparison is within the predetermined tolerance range, or (ii) instructions to add a further quantity of the feed ingredient to the bucket or remove a portion of the feed ingredient from the bucket if the weight comparison is not within the predetermined tolerance range.

45. The method of paragraph 44, wherein the instructions to transfer the quantity of the feed ingredient, the instructions to add a further quantity of the feed ingredient, or the instructions to remove a portion of the feed ingredient are displayed as a color change on the display.

46. The method of paragraph 44 or paragraph 45, wherein if the weight comparison is not within the predetermined tolerance range, the method further comprises displaying, using the computer system, the difference between the determined weight of the quantity of the feed ingredient and the target weight.

47. The method of any one of paragraphs 19-46 further comprising determining, using the computer system, a target feed scale weight, wherein the target feed scale weight is equal to a weight of the feed scale before transfer of the quantity of the feed ingredient plus a target weight of the feed ingredient.

48. The method of paragraph 47, further comprising determining, using the computer system, a target transfer weight of the feed ingredient to be transferred from the bucket of the loader to the feed scale.

49. The method of paragraph 48, further comprising displaying on the display the target transfer weight.

50. The method of paragraph 48 or paragraph 49, further comprising comparing, using the computer system, the target transfer weight to the determined weight of the quantity of the feed ingredient.

51. The method of paragraph 50, wherein the target transfer weight is greater than the determined weight of the quantity of the feed ingredient, the method further comprising, after transferring the quantity of the feed ingredient from the bucket of the loader to the feed scale, calculating, using the computer system, a subsequent target transfer weight of the feed ingredient for a subsequent addition of the feed ingredient to the feed scale.

52. The method of paragraph 51, further comprising displaying on the display the subsequent target transfer weight.

53. The method of paragraph 50, wherein the target transfer weight is less than the determined weight of the quantity of the feed ingredient, the method further comprising: removing a portion of the quantity of the feed ingredient from the bucket; determining, using the computer system, a subsequent weight of a remaining quantity of the feed ingredient in the bucket; comparing, using the computer system, the target transfer weight to the subsequent weight; and repeating the steps of removing a portion of the quantity of the feed ingredient and determining a subsequent weight of a remaining quantity of the feed ingredient in the bucket until a comparison of the target transfer weight to the subsequent weight is within a predetermined tolerance range.

54. The method of paragraph 53, wherein removing a portion of the quantity of the feed ingredient from the bucket further comprises: determining, using the computer system, a tip angle for the bucket, wherein the bucket when tipped to the tip angle will retain a quantity of the feed ingredient having a weight within the predetermined tolerance range; displaying on the display instructions to tip the bucket to the determined tip angle; and tipping the bucket to the determined tip angle.

55. The method of paragraph 53 or paragraph 54, further comprising displaying on the display instructions to stop removing portions of the quantity of the feed ingredient from the bucket when the comparison is within the predetermined tolerance range.

56. The method of paragraph 55, wherein the instructions comprise a change in color of a portion of the display.

57. The method of any one of paragraphs 53-56, further comprising: waiting a predetermined loader settling period of time; determining a final weight of the remaining quantity of the feed ingredient in the bucket; and subsequently transferring the remaining quantity of the feed ingredient from the bucket of the loader to the feed scale.

58. The method of any one of paragraphs 47-57, further comprising: determining an end weight of the feed scale after transferring the quantity of the feed ingredient to the feed scale; and calculating, using the computer system, a difference between the target feed scale weight and the end weight.

59. The method of paragraph 58, further comprising generating an alarm if the difference between the target feed scale weight and the end weight exceeds a predetermined tolerance range.

60. The method of paragraph 58 or paragraph 59, wherein determining an end weight of the feed scale comprises: waiting for a predetermined settling period of time to elapse after transferring the quantity of the feed ingredient to the feed scale; subsequently obtaining a plurality of gross feed scale weight measurements at periodic time intervals during a predetermined scale averaging period of time; and calculating, using the computer system, the end weight based on an average of the plurality of gross feed scale weight measurements.

61. The method of paragraph 60, further comprising: receiving, using the computer system, a gross feed scale weight prior to initiating the predetermined settling period of time; and comparing, using the computer system, the gross feed scale weight to a cutoff weight, wherein the cutoff weight is equal to a target gross feed scale weight minus the determined weight of the quantity of the feed ingredient in the bucket of the loader.

62. The method of paragraph 61, wherein the gross feed scale weight is greater than the cutoff weight, the method further comprising subsequently initiating the predetermined settling period of time.

63. The method of paragraph 61, wherein the gross feed scale weight prior to initiating the predetermined settling period of time is less than or equal to the cutoff weight, the method further comprising: receiving, using the computer system, user input indicating completion of feed ingredient transfer to the feed scale; and subsequently initiating the predetermined settling period of time.

64. The method of any one of paragraphs 61-63, wherein the gross feed scale weight prior to initiating the predetermined settling period of time is less than or equal to the cutoff weight, the method further comprising: determining, using the computer system, whether the gross scale weight is changing over time; and receiving, using the computer system, additional gross feed scale weights if the gross feed scale weight is changing.

65. The method of any one of paragraphs 57-64, further comprising: calculating, using the computer system, an updated target transfer weight, wherein the updated target transfer weight is the difference between the target feed scale weight and the end weight of the feed scale; and displaying on the display the updated target transfer weight.

66. A method, comprising: (a) receiving, using a computer system, measurement data comprising (i) a weight indication from a loader digital scale indicator, wherein the weight indication is determined based at least in part on pressure data from a first hydraulic pressure transducer configured to sense hydraulic pressure in a lift cylinder of a bucket on a bucket loader when the bucket is at a lifted height, (ii) height data for the bucket from a height position indicator, wherein the height data indicates the bucket height relative to a surface on which the loader is positioned, and (iii) tip angle data for the bucket from a bucket position indicator, wherein the tip angle data indicates a tip angle of the bucket relative to a horizontal bucket position in which a lower wall of the bucket is perpendicular to a direction of gravitational acceleration; (b) calculating, using the computer system and based at least in part on the measurement data and calibration data for the loader digital scale indicator, the height position indicator, and the bucket position indicator, a determined weight of a quantity of a feed ingredient in the bucket; (c) receiving, using the computer system after the feed ingredient has been transferred from the bucket to a feed scale, data from a feed batching system comprising the feed scale and a feed scale digital scale indicator, wherein the data received includes at least a transferred weight of the feed ingredient transferred from the bucket to the feed scale; (d) comparing, using the computer system, the transferred weight to the determined weight to provide a comparison; and (e) optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

67. The method of paragraph 66, further comprising: receiving, using the computer system, measurement data comprising slope data for the surface on which the loader is positioned from a surface position indicator or the height position indicator; and calculating, using the computer system and based at least in part on the measurement data and calibration data for the loader digital scale indicator, the height position indicator, the bucket position indicator, the surface position indicator, or any combination thereof, the determined weight of the quantity of the feed ingredient.

68. The method of paragraph 67, wherein the step of calibrating comprises calibrating the loader digital scale indicator, the height position indicator, the bucket position indicator, the surface position indicator, or any combination thereof.

69. The method of any one of paragraphs 66-68, wherein the computer system comprises a loader computer and a feed batching system computer, and wherein the step of receiving, using the computer system, data from the feed batching system further comprises wirelessly receiving with the loader computer the data from the feed batching system computer.

70. The method of any one of paragraphs 66-68, wherein the computer system comprises a feed batching system computer, and wherein the step of receiving, using the computer system, measurement data comprises wirelessly receiving with the feed batching system computer measurement data transmitted from the loader digital scale indicator, the height position indicator, the bucket position indicator, the surface position indicator, or any combination thereof.

71. The method of any one of paragraphs 66-69, wherein the computer system further comprises a touchscreen display that is configured to (i) receive and display data output from the computer system, and (ii) transmit user input to the computer system, the method further comprising: comparing, using the computer system, the determined weight of the quantity of the feed ingredient in the bucket to a target weight of the feed ingredient; and displaying, based on the comparison, on the display an indication of whether the weight of the feed ingredient is below, meets, or exceeds the target weight.

72. The method of paragraph 71, further comprising generating an alarm if the determined weight of the quantity of the feed ingredient exceeds a predetermined tolerance level for deviation from the target weight.

73. The method of any of paragraphs 66-72, further comprising displaying on the loader bucket weight status bar an indication of the determined weight of the quantity of the feed ingredient.

74. The method of paragraph 73, further comprising: calculating, using the computer system, a determined weight of the quantity of the feed ingredient at periodic time intervals to provide a plurality of determined weights; calculating, using the computer system, an average determined weight; and displaying on the loader bucket weight status bar an updated indication of the determined weight of the quantity of the feed ingredient based on the average determined weight.

75. The method of any one of paragraphs 66-74, further comprising receiving, using the computer system, an identity of the feed ingredient. 76. The method of paragraph 75, wherein the step of calculating the determined weight of the quantity of the feed ingredient is further based at least in part on the identity of the feed ingredient.

77. The method of paragraph 75 or paragraph 76, wherein the step of calibrating the loader digital scale indicator, the height position indicator, or both, is further based at least in part on the identity of the feed ingredient.

78. The method of any one of paragraphs 66-77, further comprising: determining, using the computer system, whether the height of the bucket is within a linear calibration range; and generating, using the computer system, an alarm if the height of the bucket is outside the linear calibration range.

79. The method of any one of paragraphs 66-78, further comprising receiving, using the computer system, a target weight for the feed ingredient.

80. The method of paragraph 79, further comprising: calculating, using the computer system, a difference between the determined weight of the quantity of the feed ingredient and the target weight to provide a weight comparison; and determining, using the computer system, whether the weight comparison is within a predetermined tolerance range.

81. The method of paragraph 80, further comprising displaying on the display (i) instructions to transfer the quantity of the feed ingredient from the bucket of the loader to the feed scale if the weight comparison is within the predetermined tolerance range, or (ii) instructions to add a further quantity of the feed ingredient to the bucket or remove a portion of the feed ingredient from the bucket if the weight comparison is not within the predetermined tolerance range.

82. The method of paragraph 81, wherein the instructions to transfer the quantity of the feed ingredient, the instructions to add a further quantity of the feed ingredient, or the instructions to remove a portion of the feed ingredient are displayed as a color change on the display. 83. The method of paragraph 81 or paragraph 82, wherein if the weight comparison is not within the predetermined tolerance range, the method further comprises displaying, using the computer system, the difference between the determined weight of the quantity of the feed ingredient and the target weight.

84. The method of any one of paragraphs 66-83, further comprising determining, using the computer system, a target feed scale weight, wherein the target feed scale weight is equal to a weight of the feed scale before transfer of the quantity of the feed ingredient plus a target weight of the feed ingredient.

85. The method of paragraph 84, further comprising determining, using the computer system, a target transfer weight of the feed ingredient to be transferred from the bucket of the loader to the feed scale.

86. The method of paragraph 85, further comprising displaying on the display the target transfer weight.

87. The method of paragraph 85 or paragraph 86, further comprising comparing, using the computer system, the target transfer weight to the determined weight of the quantity of the feed ingredient.

88. The method of paragraph 87, wherein the target transfer weight is greater than the determined weight of the quantity of the feed ingredient, the method further comprising, after transferring the quantity of the feed ingredient from the bucket of the loader to the feed scale, calculating, using the computer system, a subsequent target transfer weight of the feed ingredient for a subsequent addition of the feed ingredient to the feed scale.

89. The method of paragraph 88, further comprising displaying on the display the subsequent target transfer weight.

90. The method of paragraph 87, wherein the target transfer weight is less than the determined weight of the quantity of the feed ingredient, the method further comprising: determining, using the computer system, a subsequent weight of a remaining quantity of the feed ingredient in the bucket after a portion of the feed ingredient has been removed from the bucket; and comparing, using the computer system, the target transfer weight to the subsequent weight.

91. The method of paragraph 90, further comprising displaying on the display instructions to stop removing portions of the quantity of the feed ingredient from the bucket when the comparison is within a predetermined tolerance range.

92. The method of paragraph 91, wherein the instructions comprise a change in color of a portion of the display.

93. The method of any one of paragraphs 90-92, further comprising: waiting a predetermined loader settling period of time; determining a final weight of the remaining quantity of the feed ingredient in the bucket; and subsequently transferring the remaining quantity of the feed ingredient from the bucket of the loader to the feed scale.

94. The method of any one of paragraphs 85-93, further comprising: determining an end weight of the feed scale after transferring the quantity of the feed ingredient to the feed scale; and calculating, using the computer system, a difference between the target feed scale weight and the end weight.

95. The method of paragraph 94, further comprising generating an alarm if the difference between the target feed scale weight and the end weight exceeds a predetermined tolerance range.

96. The method of paragraph 94 or paragraph 95, wherein determining an end weight of the feed scale comprises: waiting for a predetermined settling period of time to elapse after transferring the quantity of the feed ingredient to the feed scale; subsequently obtaining a plurality of gross feed scale weight measurements at periodic time intervals during a predetermined scale averaging period of time; and calculating, using the computer system, the end weight based on an average of the plurality of gross feed scale weight measurements.

97. The method of paragraph 96, further comprising: receiving, using the computer system, a gross feed scale weight prior to initiating the predetermined settling period of time; and comparing, using the computer system, the gross feed scale weight to a cutoff weight, wherein the cutoff weight is equal to a target gross feed scale weight minus the determined weight of the quantity of the feed ingredient in the bucket of the loader.

98. The method of paragraph 97, wherein the gross feed scale weight is greater than the cutoff weight, the method further comprising subsequently initiating the predetermined settling period of time.

99. The method of paragraph 97, wherein the gross feed scale weight prior to initiating the predetermined settling period of time is less than or equal to the cutoff weight, the method further comprising: receiving, using the computer system, user input indicating completion of feed ingredient transfer to the feed scale; and subsequently initiating the predetermined settling period of time.

100. The method of any one of paragraphs 97-99, wherein the gross feed scale weight prior to initiating the predetermined settling period of time is less than or equal to the cutoff weight, the method further comprising: determining, using the computer system, whether the gross scale weight is changing over time; and receiving, using the computer system, additional gross feed scale weights if the gross feed scale weight is changing.

101. The method of any one of paragraphs 94-100, further comprising: calculating, using the computer system, an updated target transfer weight, wherein the updated target transfer weight is the difference between the target feed scale weight and the end weight of the feed scale; and displaying on the display the updated target transfer weight.

102. The method of any one of paragraphs 66-101, wherein calibration is performed after each comparison of the transferred weight to the determined weight.

103. The method of any one of paragraphs 66-101, wherein the comparison is the difference between the transferred weight and the determined weight, and calibration is performed if the comparison is outside a predetermined tolerance range.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A method, comprising:
in a system comprising (i) a first hydraulic pressure transducer, (ii) a loader digital scale indicator, (iii) a height position indicator, (iv) a bucket position indicator, and (v) a computer system configured to (a) receive data from the loader digital scale indicator, (b) receive data from the height position indicator, (c) receive data from the bucket position indicator, (d) determine, based at least in part on (1) the data received from the loader digital scale indicator, the height position indicator, and the bucket position indicator, and (2) stored calibration data comprising combinations of digital scale data and position indicator data, a determined weight of a feed ingredient in the bucket, (e) receive data from a separate feed batching system comprising a feed scale and a feed scale digital scale indicator, (f) compare a weight of the feed ingredient transferred from the bucket to the feed scale to the determined weight to provide a comparison, and (g) optionally, use the comparison as a data calibration factor for data received from the loader digital scale indicator, the height position indicator, the bucket position indicator, or any combination thereof, to provide increased accuracy of a subsequent determined weight of a subsequent quantity of the feed ingredient in the bucket,
receiving, using the computer system, a target weight of a feed ingredient;
loading a quantity of the feed ingredient into a bucket of a loader, the loader comprising a display in a cab of the loader for receiving and displaying information to a user of the loader;
lifting, with a lifting arm comprising a hydraulic lift cylinder, the bucket of the loader to a lifted height;
determining a weight of the quantity of the feed ingredient in the bucket by calculating, using the system, and based at least in part on measurement data and calibration data for the loader digital scale indicator, the height position indicator, and the bucket position indicator, a determined weight of the quantity of the feed ingredient in the bucket, wherein (i) the loader digital scale indicator is configured to receive pressure data from the first hydraulic pressure transducer and provide an indication of a combined weight of the bucket and the quantity of the feed ingredient therein based on the pressure data, (ii) the first hydraulic pressure transducer is configured to sense hydraulic pressure in the hydraulic lift cylinder, (iii) the height position indicator is configured to measure height of the bucket relative to a surface on which the loader is positioned, and (iv) the bucket position indicator is configured to measure a tip angle of the bucket relative to a horizontal bucket position in which a lower wall of the bucket is perpendicular to a direction of gravitational acceleration;
calculating, using the computer system, a difference between the determined weight of the quantity of the feed ingredient and the target weight to provide a weight comparison;
determining, using the computer system, whether the weight comparison is within a predetermined tolerance range;
displaying on the display (i) instructions to transfer the quantity of the feed ingredient from the bucket of the loader to the feed scale if the weight comparison is within the predetermined tolerance range, or (ii) instructions to add a further quantity of the feed ingredient to the bucket or remove a portion of the feed ingredient from the bucket if the weight comparison is not within the predetermined tolerance range, optionally wherein the instructions to transfer the quantity of the feed ingredient, the instructions to add a further quantity of the feed ingredient, or the instructions to remove a portion of the feed ingredient are displayed as a color change on the display;

transferring the quantity of the feed ingredient from the bucket of the loader to the feed scale of the feed batching system;

receiving, using the computer system, data from the feed batching system, wherein the data received from the feed batching system includes at least a transferred weight of the quantity of the feed ingredient transferred from the bucket to the feed scale;

comparing, using the computer system, the transferred weight to the determined weight of the quantity of the feed ingredient to provide a comparison; and optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

2. The method of claim 1, wherein determining the weight of the quantity of the feed ingredient in the bucket further comprises:

receiving, using the loader digital scale indicator, pressure data from the first hydraulic pressure transducer;

determining, using the loader digital scale indicator, a weight indication of a combined weight of the quantity of the feed ingredient and the bucket;

measuring with the height position indicator the height of the bucket, when the bucket is at the lifted height, relative to the surface on which the loader is positioned;

measuring with the bucket position indicator the tip angle of the bucket relative to the horizontal bucket position in which the lower wall of the bucket is perpendicular to the direction of gravitational acceleration;

receiving, using the computer system, measurement data comprising the weight indication from the loader digital scale indicator, height data from the height position indicator, and tip angle data from the bucket position indicator; and calculating, using the computer system and based at least in part on the measurement data and calibration data for the loader digital scale indicator, the height position indicator, and the bucket position indicator, the determined weight of the quantity of the feed ingredient in the bucket.

3. The method of claim 2, wherein the height of the bucket is measured at an attachment point of the bucket to a lift arm of the loader.

4. The method of claim 1, wherein:
(i) calibration is performed after each comparison; or
(ii) the comparison is a difference between the transferred weight and the determined weight of the quantity of the feed ingredient, and calibration is performed if the comparison is outside the predetermined tolerance range.

5. The method of claim 2, further comprising:
measuring with a surface position indicator or the height position indicator a slope of the surface on which the loader is positioned;

receiving, using the computer system, measurement data comprising slope data from the surface position indicator or the height position indicator; and calculating, using the computer system and based at least in part on the measurement data and calibration data for the loader digital scale indicator, the height position indicator, the bucket position indicator, and the surface position indicator, the determined weight of the quantity of the feed ingredient.

6. The method of claim 1, further comprising:
comparing, using the computer system, the determined weight of the quantity of the feed ingredient in the bucket to the target weight of the feed ingredient to provide a comparison; and (i) displaying, based on the comparison, on the display an indication of whether the determined weight of the quantity of the feed ingredient is below, meets, or exceeds the target weight; or (ii) generating an alarm if the determined weight of the quantity of the feed ingredient exceeds the predetermined tolerance level; or (iii) both (i) and (ii).

7. The method of claim 6, wherein the alarm is an audible alarm, a visible alarm, or a visual and audible alarm.

8. The method of claim 1, further comprising:
determining, using the computer system, whether the height of the bucket is within a linear calibration range; and generating, using the computer system, an alarm if the height of the bucket is outside the linear calibration range.

9. The method of claim 8, wherein the alarm is an audible alarm, a visible alarm, or a visual and audible alarm.

10. The method of claim 1, further comprising:
determining, using the computer system, a target feed scale weight, wherein the target feed scale weight is equal to a weight of the feed scale of the feed batching system before transfer of the quantity of the feed ingredient plus the target weight of the feed ingredient;

determining, using the computer system, a target transfer weight of the feed ingredient to be transferred from the bucket of the loader to the feed scale and, optionally, displaying on the display the target transfer weight; and comparing, using the computer system, the target transfer weight to the determined weight of the quantity of the feed ingredient.

11. The method of claim 10, wherein the target transfer weight is greater than the determined weight of the quantity of the feed ingredient, the method further comprising:

after transferring the quantity of the feed ingredient from the bucket of the loader to the feed scale, calculating, using the computer system, a subsequent target transfer weight of the feed ingredient for a subsequent addition of the feed ingredient to the feed scale; and displaying on the display the subsequent target transfer weight.

12. The method of claim 10, wherein the target transfer weight is less than the determined weight of the quantity of the feed ingredient, the method further comprising:

removing a portion of the quantity of the feed ingredient from the bucket;

determining, using the computer system, a subsequent weight of a remaining quantity of the feed ingredient in the bucket;

comparing, using the computer system, the target transfer weight to the subsequent weight;

repeating the steps of removing a portion of the quantity of the feed ingredient and determining a subsequent weight of a remaining quantity of the feed ingredient in the bucket until a comparison of the target transfer weight to the subsequent weight is within the predetermined tolerance range; and displaying on the display instructions to stop removing portions of the quantity of the feed ingredient from the bucket when the comparison is within the predetermined tolerance range, optionally wherein the instructions comprise a change in color of a portion of the display.

13. The method of claim 12, wherein removing the portion comprises:

determining, using the computer system, a tip angle for the bucket, wherein the bucket when tipped to the tip angle will retain a quantity of the feed ingredient having a weight within the predetermined tolerance range;

displaying on the display instructions to tip the bucket to the determined tip angle; and tipping the bucket to the determined tip angle.

14. A method, comprising:

in a system comprising (i) a first hydraulic pressure transducer, (ii) a loader digital scale indicator, (iii) a height position indicator, (iv) a bucket position indicator, and (v) a computer system configured to (a) receive data from the loader digital scale indicator, (b) receive data from the height position indicator, (c) receive data from the bucket position indicator, (d) determine, based at least in part on (1) the data received from the loader digital scale indicator, the height position indicator, and the bucket position indicator, and (2) stored calibration data comprising combinations of digital scale data and position indicator data, a determined weight of a feed ingredient in the bucket, (e) receive data from a separate feed batching system comprising a feed scale and a feed scale digital scale indicator, (f) compare a weight of the feed ingredient transferred from the bucket to the feed scale to the determined weight to provide a comparison, and (g) optionally, use the comparison as a data calibration factor for data received from the loader digital scale indicator, the height position indicator, the bucket position indicator, or any combination thereof, to provide increased accuracy of a subsequent determined weight of a subsequent quantity of the feed ingredient in the bucket, loading a quantity of a feed ingredient into a bucket of a loader, the loader comprising a display in a cab of the loader for receiving and displaying information to a user of the loader, wherein the display is configured to (i) receive and display data output from the computer, (ii) transmit user input to the computer, and (iii) display a loader bucket weight status bar;

lifting, with a lifting arm comprising a hydraulic lift cylinder, the bucket of the loader to a lifted height;

determining a weight of the quantity of the feed ingredient in the bucket by calculating, using the system, and based at least in part on measurement data and calibration data for the loader digital scale indicator, the height position indicator, and the bucket position indicator, a determined weight of the quantity of the feed ingredient in the bucket, wherein (i) the loader digital scale indicator is configured to receive pressure data from the first hydraulic pressure transducer and provide an indication of a combined weight of the bucket and the quantity of the feed ingredient therein based on the pressure data, (ii) the first hydraulic pressure transducer is configured to sense hydraulic pressure in the hydraulic lift cylinder, (iii) the height position indicator is configured to measure height of the bucket relative to a surface on which the loader is positioned, and (iv) the bucket position indicator is configured to measure a tip angle of the bucket relative to a horizontal bucket position in which a lower wall of the bucket is perpendicular to a direction of gravitational acceleration;

displaying on the loader bucket weight status bar an indication of the determined weight of the quantity of the feed ingredient of the quantity of the feed ingredient;

calculating, using the computer system, a determined weight of the quantity of the feed ingredient at periodic time intervals to provide a plurality of determined weights;

calculating, using the computer system, an average determined weight;

displaying on the loader bucket weight status bar an updated indication of the determined weight of the quantity of the feed ingredient based on the average determined weight;

transferring the quantity of the feed ingredient from the bucket of the loader to the feed scale of the feed batching system;

receiving, using the computer system, data from the feed batching system, wherein the data received from the feed batching system includes at least a transferred weight of the quantity of the feed ingredient transferred from the bucket to the feed scale;

comparing, using the computer system, the transferred weight to the determined weight to provide a comparison; and optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

15. A method, comprising:

in a system comprising (i) a first hydraulic pressure transducer, (ii) a loader digital scale indicator, (iii) a height position indicator, (iv) a bucket position indicator, and (v) a computer system configured to (a) receive data from the loader digital scale indicator, (b) receive data from the height position indicator, (c) receive data from the bucket position indicator, (d) determine, based at least in part on (1) the data received from the loader digital scale indicator, the height position indicator, and the bucket position indicator, and (2) stored calibration data comprising combinations of digital scale data and position indicator data, a determined weight of a feed ingredient in the bucket, (e) receive data from a separate feed batching system comprising a feed scale and a feed scale digital scale indicator, (f) compare a weight of the feed ingredient transferred from the bucket to the feed scale to the determined weight to provide a comparison, and (g) optionally, use the comparison as a data calibration factor for data received from the loader digital scale indicator, the height position indicator, the bucket position indicator, or any combination thereof, to provide increased accuracy of a subsequent determined weight of a subsequent quantity of the feed ingredient in the bucket, loading a quantity of a feed ingredient into a bucket of a loader, the loader comprising a display in a cab of the loader for receiving and displaying information to a user of the loader;

lifting, with a lifting arm comprising a hydraulic lift cylinder, the bucket of the loader to a lifted height;

determining a weight of the quantity of the feed ingredient in the bucket by calculating, using the system, and based at least in part on measurement data and calibration data for the loader digital scale indicator, the height position indicator, and the bucket position indicator, a determined weight of the quantity of the feed ingredient in the bucket, wherein (i) the loader digital scale indicator is configured to receive pressure data from the first hydraulic pressure transducer and provide an indication of a combined weight of the bucket and the quantity of the feed ingredient therein based on the pressure data, (ii) the first hydraulic pressure transducer is configured to sense hydraulic pressure in the hydraulic lift cylinder, (iii) the height position indicator is configured to measure height of the bucket relative to a surface on which the loader is positioned, and (iv) the bucket position indicator is configured to measure a tip angle of the bucket relative to a horizontal bucket position in which a lower wall of the bucket is perpendicular to a direction of gravitational acceleration;

determining, using the computer system, a target feed scale weight, wherein the target feed scale weight is equal to a weight of the feed scale of the feed batching system before transfer of the quantity of the feed ingredient plus a target weight of the feed ingredient;

determining, using the computer system, a target transfer weight of the feed ingredient to be transferred from the bucket of the loader to the feed scale and, optionally, displaying on the display the target transfer weight;

comparing, using the computer system, the target transfer weight to the determined weight of the quantity of the feed ingredient;

transferring the quantity of the feed ingredient from the bucket of the loader to the feed scale;

determining an end weight of the feed scale after transferring the quantity of the feed ingredient to the feed scale, wherein determining the end weight comprises
  waiting for a predetermined settling period of time to elapse after transferring the quantity of the feed ingredient to the feed scale,
  subsequently obtaining a plurality of gross feed scale weight measurements at periodic time intervals during a predetermined scale averaging period of time, and
  calculating, using the computer system, the end weight based on an average of the plurality of gross feed scale weight measurements;

calculating, using the computer system, a difference between the target feed scale weight and the end weight and, optionally, generating an alarm if the difference between the target feed scale weight and the end weight exceeds a predetermined tolerance range;

receiving, using the computer system, data from the feed batching system, wherein the data received from the feed batching system includes at least a transferred weight of the quantity of the feed ingredient transferred from the bucket to the feed scale;

comparing, using the computer system, the transferred weight to the determined weight of the quantity of the feed ingredient to provide a comparison;

optionally, calibrating, using the computer system, data received from the loader digital scale indicator, the height position indicator, the bucket position indicator, or any combination thereof, based at least in part on the comparison, to provide increased accuracy of a subsequent determined weight of a subsequent quantity of the feed ingredient in the bucket.

\* \* \* \* \*